(12) United States Patent
Garcia et al.

(10) Patent No.: US 12,353,791 B1
(45) Date of Patent: Jul. 8, 2025

(54) NOISE DEPENDENT VOLUME CONTROL

(71) Applicant: Amazon Technologies, Inc., Seattle, WA (US)

(72) Inventors: Guillermo Daniel Garcia, Berkeley, CA (US); Shobha Devi Kuruba Buchannagari, Fremont, CA (US); Carlo Murgia, Santa Clara, CA (US); Mazher Ali Khan, San Jose, CA (US); Berkant Tacer, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 415 days.

(21) Appl. No.: 17/854,194

(22) Filed: Jun. 30, 2022

(51) Int. Cl.
| | |
|---|---|
| *H03G 3/32* | (2006.01) |
| *G06F 3/16* | (2006.01) |
| *G10L 25/21* | (2013.01) |
| *G10L 25/69* | (2013.01) |
| *G10L 25/84* | (2013.01) |
| *H04R 3/00* | (2006.01) |
| *H04R 29/00* | (2006.01) |

(52) U.S. Cl.
CPC .............. *G06F 3/165* (2013.01); *G10L 25/21* (2013.01); *G10L 25/69* (2013.01); *G10L 25/84* (2013.01); *H04R 3/00* (2013.01); *H04R 29/001* (2013.01); *H04R 2430/01* (2013.01)

(58) Field of Classification Search
CPC ......................................................... H03G 3/32
See application file for complete search history.

(56) References Cited

U.S. PATENT DOCUMENTS

| | | | | |
|---|---|---|---|---|
| 5,907,622 | A * | 5/1999 | Dougherty | ............... H03G 3/32 381/108 |
| 2021/0233548 | A1* | 7/2021 | Wang | ................... G10L 21/0208 |

\* cited by examiner

*Primary Examiner* — Ping Lee
(74) *Attorney, Agent, or Firm* — Pierce Atwood LLP

(57) ABSTRACT

A system configured to perform noise dependent volume control in order to increase a volume level of the playback audio in a noisy environment. For example, a device may adaptively increase gain based on an amount of ambient noise present in the environment. The device may determine a gain value based on a noise reference value and an estimated noise floor. The device may determine the estimated noise floor based on continuous noises, ignoring transient sounds and user speech. In addition, the device may include volume control logic to ensure that the volume level only increases when necessary and/or to control a rate at which the volume level increases. As part of selecting the volume level with which to generate the playback audio, the device may use a lookup table to convert between a device volume and a quantized volume used to perform noise dependent volume control.

20 Claims, 16 Drawing Sheets

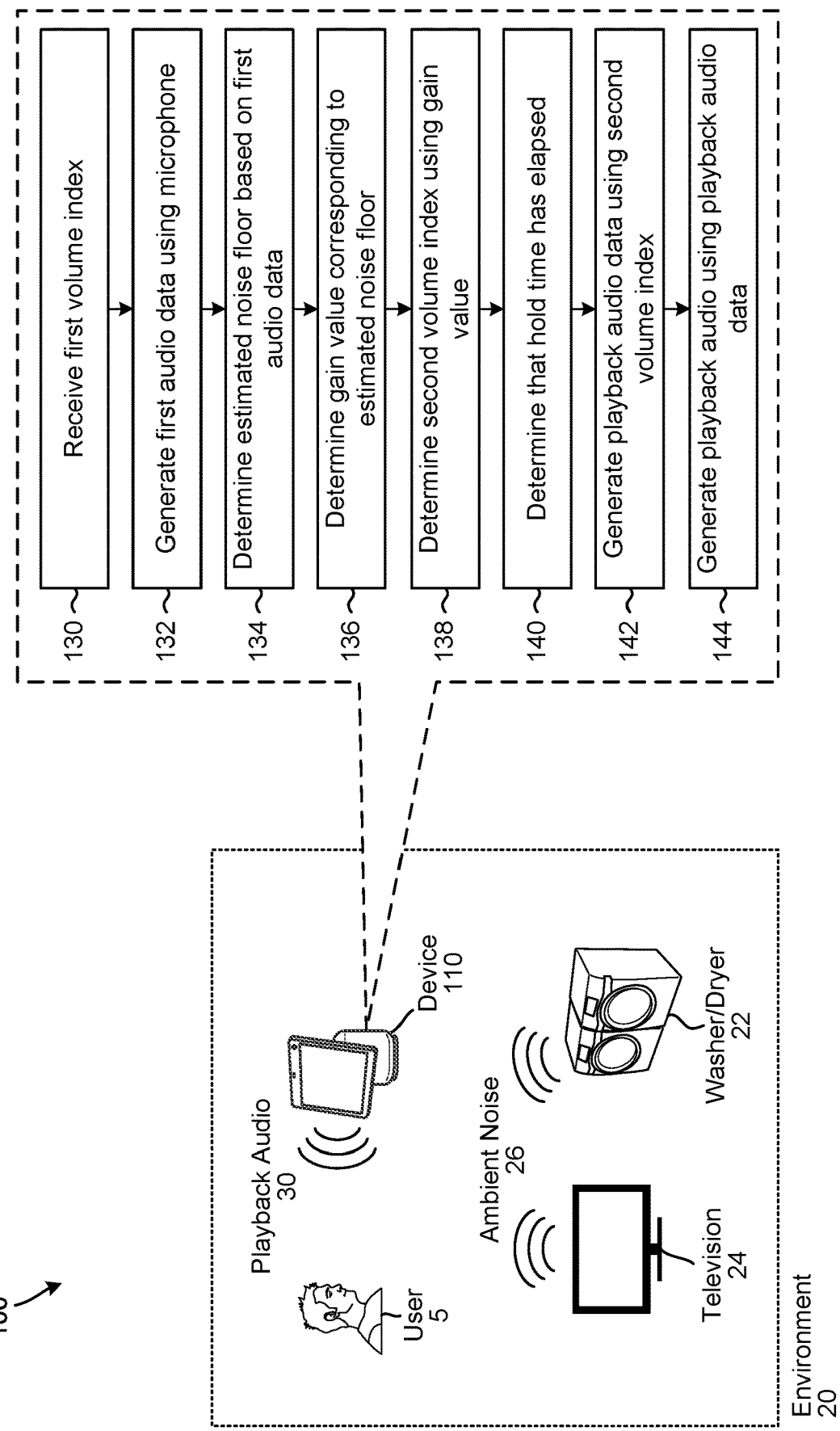

FIG. 5

Volume Table 500

| | Value (dB) |
|---|---|
| 0 | 0 |
| 1 | -2 |
| 2 | -4 |
| 3 | -6 |
| 4 | -8 |
| 5 | -10 |
| ... | ... |
| 28 | -66 |
| 29 | -70 |
| 30 | -200 |

NOISE DEPENDENT VOLUME CONTROL

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 1 illustrates a system configured to perform noise dependent volume control according to embodiments of the present disclosure.

FIG. 5 illustrates an example of a quantized volume table according to embodiments of the present disclosure.

DETAILED DESCRIPTION

Figure 2A:
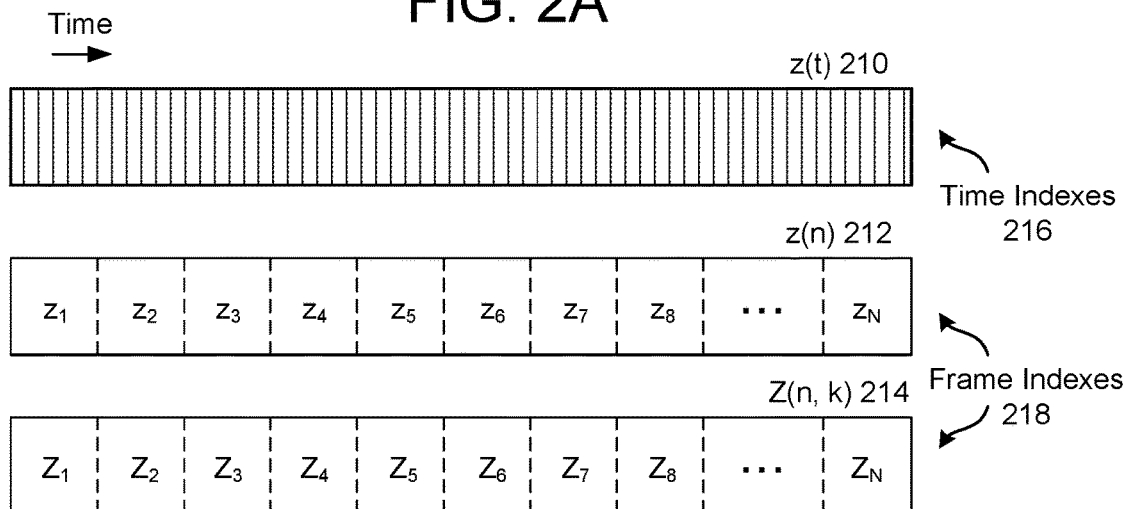
FIGS. 2A-2D illustrate examples of frame indexes, tone indexes, and channel indexes.

Electronic devices may be used to capture input audio and output playback audio. For example, a device may include one or more microphones configured to capture input audio and generate microphone audio data. In addition, the device may be configured to receive playback audio data and generate playback audio using one or more loudspeakers. For example, the device may generate playback audio corresponding to a communication session or media content, such as music, a movie, and/or the like. When the device generates playback audio in a quiet environment, a user of the device may perceive the playback audio clearly. However, a noisy environment may decrease intelligibility of speech and/or clarity of music or other content.

To improve a customer experience, devices, systems and methods are disclosed that perform noise dependent volume control in order to increase a volume level of the playback audio in a noisy environment. For example, a device may adaptively increase gain based on an amount of ambient noise present in the environment. To perform noise dependent volume control, the device may determine a noise reference value and an estimated noise floor and determine the amount of gain based on a difference between the estimated noise floor and the noise reference value. However, the device may not automatically increase the volume level based on the difference, as the device may employ volume control logic to ensure that the volume level only increases when necessary and/or to control a rate at which the volume level increases. As part of selecting the volume level with which to generate the playback audio, the device may use a lookup table to convert between a device volume and a quantized volume used to perform noise dependent volume control.

FIG. 1 illustrates a high-level conceptual block diagram of a system 100 configured to perform noise dependent volume control according to embodiments of the present disclosure. Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include a device 110, which may be communicatively coupled to network(s) 199 and/or system(s) 120, although the disclosure is not limited thereto.

The device 110 may be an electronic device configured to capture and/or receive audio data. For example, the device 110 may include a microphone array configured to generate audio data, although the disclosure is not limited thereto and the device 110 may include multiple microphones without departing from the disclosure. As is known and used herein, "capturing" an audio signal and/or generating audio data includes a microphone transducing audio waves (e.g., sound waves) of captured sound to an electrical signal and a codec digitizing the signal to generate the microphone audio data. In addition to capturing the input audio data, the device 110 may be configured to receive playback audio data and generate playback audio (e.g., output audio) using one or more loudspeakers of the device 110. For example, the device 110 may generate playback audio corresponding to media content, such as music, a movie, and/or the like.

In some examples, a user 5 of the device 110 may establish a communication session with another device, where digitized speech signals are compressed, packetized, and transmitted via the network(s) 199. One technique for establishing the communication session involves Voice over Internet Protocol (VoIP), although the disclosure is not limited thereto and the device 110 may use other techniques without departing from the disclosure. During a communication session, the device 110 may receive far-end reference signal(s) (e.g., playback audio data) from a remote device/remote server(s) via the network(s) 199 and may generate playback audio (e.g., output audio) based on the far-end reference signal(s) using the one or more loudspeaker(s).

Using one or more microphone(s) 112 associated with the device 110, the device 110 may capture input audio as microphone signals (e.g., near-end reference audio data, input audio data, microphone audio data, etc.), may perform audio processing to the microphone signals to generate an output signal (e.g., output audio data), and may send the output signal to the remote device/remote server(s) via the network(s) 199. For example, the device 110 may send the output signal to the remote device either directly or via remote server(s) and may receive the far-end reference signal(s) from the remote device either directly or via the remote server(s).

As illustrated in FIG. 1, an environment 20 of the device 110 may include the user 5 and one or more noise sources, although the disclosure is not limited thereto. For example, FIG. 1 illustrates that the environment 20 may include the user 5, the device 110, and two noise sources; a washer/dryer 22 (e.g., first noise source) and a television 24 (e.g., second noise source). At various times, one or both of the noise sources may generate audible noises that may be represented in the input audio data generated by the device 110.

As part of outputting media content and/or the communication session, the device 110 may generate playback audio 30 for the user 5. In a quiet environment, the user 5 may perceive the playback audio 30 without interference or competition from other sound sources in proximity to the device 110. However, the noise sources may create ambient noise 26 that distracts from the playback audio 30 and/or impacts the user's ability to perceive the playback audio 30. For example, the noisy environment may decrease intelligibility of speech, clarity/fidelity of music or other content, and/or the like.

To improve a customer experience listening to the playback audio 30, the device 110 may perform noise dependent volume control in order to increase a volume level of the playback audio 30 in a noisy environment. For example, the device 110 may adaptively increase gain based on an amount of the ambient noise 26 present in the environment 20. The device 110 may determine a noise reference value and an estimated noise floor and determine the amount of gain based on a difference between the two. However, the device 110 may not automatically increase the volume level based on the difference; the device 110 may employ volume control logic to ensure that the volume level only increases when necessary and/or to control a rate at which the volume level increases. As part of selecting the volume level with which to generate the playback audio, the device 110 may use a lookup table to convert between a device volume and a quantized volume used to perform noise dependent volume control.

As illustrated in FIG. 1, the device 110 may receive (130) a first volume index associated with playback audio, may generate (132) first audio data using the microphone(s), and may determine (134) an estimated noise floor based on the first audio data. For example, the device 110 may perform echo cancellation using the first audio data to generate isolated audio data and then may determine the estimated noise floor using particular frequency range(s) of interest within the isolated audio data. In some examples, the device 110 may determine a plurality of energy values corresponding to noise in the environment 20 and may include a leaky integrator configured to determine the estimated noise floor using the plurality of energy values. For example, the leaky integrator may be configured to apply a slow attack time constant and a fast release time constant in order to track an estimated noise floor value that represents a lower energy portion of the plurality of energy values.

The device 110 may determine (136) a gain value corresponding to the estimated noise floor. For example, the device 110 may determine a noise reference value, as described in greater detail below with regard to FIG. 7, and may determine the gain value based on a difference between the estimated noise floor value and the noise reference value, as described in greater detail below with regard to FIG. 6. After determining the gain value, the device 110 may determine (138) a second volume index using the gain value. In some examples, the device 110 may determine the second volume index (e.g., target volume index) by adding the gain value to the first volume index. However, the disclosure is not limited thereto, and the device 110 may determine that a sum of the first volume index and the gain value exceeds a maximum volume level and set the second volume index equal to the maximum volume level without departing from the disclosure. Additionally or alternatively, the device 110 may control a rate at which the volume level changes and/or only perform volume adaptation if a minimum gain threshold value is exceeded.

After determining the second volume index, the device 110 may determine (140) that a hold time has elapsed. In some examples, the device 110 may perform volume control processing, as described in greater detail below with regard to FIG. 4, to control a frequency at which the volume level changes. For example, the hold time may correspond to a first duration of time if the second volume index changes the volume level in the same direction as a previous volume level change, and the device 110 may only perform volume adaptation if the first duration of time has elapsed since the previous volume level change. Additionally or alternatively, the hold time may correspond to a second duration of time if the second volume index changes the volume in an opposite direction as the previous volume level change, and the device 110 may only perform volume adaptation if the second duration of time has elapsed since the previous volume level change. Thus, the device 110 may prevent any volume changes for the first duration of time and may prevent the volume change from reversing for the second duration of time, although the disclosure is not limited thereto.

If the device 110 determines that the hold time has elapsed, the device 110 may generate (142) playback audio data using the second volume index and may generate (144) playback audio using the playback audio data. For example, the device 110 may receive second audio data to output and the device 110 may generate the playback audio data by applying the second volume index to the second audio data, although the disclosure is not limited thereto. Thus, the second volume index may correspond to an updated volume setting of the device 110 and the device 110 may use the updated volume setting to generate the playback audio in order to compensate for the ambient noise present in the environment 20.

An audio signal is a representation of sound and an electronic representation of an audio signal may be referred to as audio data, which may be analog and/or digital without departing from the disclosure. For ease of illustration, the disclosure may refer to either audio data (e.g., microphone audio data, input audio data, etc.) or audio signals (e.g., microphone audio signal, input audio signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing, such as adaptive feedback reduction (AFR) processing, acoustic echo cancellation (AEC), adaptive interference cancellation (AIC), noise reduction (NR) processing, tap detection, and/or the like. For example, the device 110 may convert the time-domain signal to the subband-domain by applying a bandpass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

As used herein, a frequency band (e.g., frequency bin) corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

FIGS. 2A-2D illustrate examples of frame indexes, tone indexes, and channel indexes. As described above, the device 110 may generate microphone audio data z(t) using microphone(s). For example, a first microphone may generate first microphone audio data z1(t) in the time-domain, a second microphone may generate second microphone audio data z2(t) in the time-domain, and so on. As illustrated in FIG. 2A, a time-domain signal may be represented as microphone audio data z(t) 210, which is comprised of a sequence of individual samples of audio data. Thus, z(t) denotes an individual sample that is associated with a time t.

While the microphone audio data z(t) 210 is comprised of a plurality of samples, in some examples the device 110 may group a plurality of samples and process them together. As illustrated in FIG. 2A, the device 110 may group a number of samples together in a frame to generate microphone audio data z(n) 212. As used herein, a variable z(n) corresponds to the time-domain signal and identifies an individual frame (e.g., fixed number of samples s) associated with a frame index n.

In some examples, the device 110 may convert microphone audio data z(t) 210 from the time-domain to the subband-domain. For example, the device 110 may use a plurality of bandpass filters to generate microphone audio data z(t, k) in the subband-domain, with an individual bandpass filter centered on a narrow frequency range. Thus, a first bandpass filter may output a first portion of the microphone audio data z(t) 210 as a first time-domain signal associated with a first subband (e.g., first frequency range), a second bandpass filter may output a second portion of the microphone audio data z(t) 210 as a time-domain signal associated with a second subband (e.g., second frequency range), and so on, such that the microphone audio data z(t, k) comprises a plurality of individual subband signals (e.g., subbands). As used herein, a variable z(t, k) corresponds to the subband-domain signal and identifies an individual sample associated with a particular time t and tone index k.

For ease of illustration, the previous description illustrates an example of converting microphone audio data z(t) 210 in the time-domain to microphone audio data z(t, k) in the subband-domain. However, the disclosure is not limited thereto, and the device 110 may convert microphone audio data z(n) 212 in the time-domain to microphone audio data z(n, k) the subband-domain without departing from the disclosure.

Additionally or alternatively, the device 110 may convert microphone audio data z(n) 212 from the time-domain to a frequency-domain. For example, the device 110 may perform Discrete Fourier Transforms (DFTs) (e.g., Fast Fourier transforms (FFTs), short-time Fourier Transforms (STFTs), and/or the like) to generate microphone audio data Z(n, k) 214 in the frequency-domain. As used herein, a variable Z(n, k) corresponds to the frequency-domain signal and identifies an individual frame associated with frame index n and tone index k. As illustrated in FIG. 2A, the microphone audio data z(t) 212 corresponds to time indexes 216, whereas the microphone audio data z(n) 212 and the microphone audio data Z(n, k) 214 corresponds to frame indexes 218.

A Fast Fourier Transform (FFT) is a Fourier-related transform used to determine the sinusoidal frequency and phase content of a signal, and performing FFT produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data Z(n). However, the disclosure is not limited thereto and the system 100 may instead perform short-time Fourier transform (STFT) operations without departing from the disclosure. A short-time Fourier transform is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency-domain representation of that same waveform comprises a plurality of discrete amplitude values, where each amplitude value is for a different tone or "bin." So, for example, if the sound wave consisted solely of a pure sinusoidal 1 kHz tone, then the frequency-domain representation would consist of a discrete amplitude spike in the bin containing 1 kHz, with the other bins at zero. In other words, each tone "k" is a frequency index (e.g., frequency bin).

FIG. 2A illustrates an example of time indexes 216 (e.g., microphone audio data z(t) 210) and frame indexes 218 (e.g., microphone audio data z(n) 212 in the time-domain and microphone audio data Z(n, k) 216 in the frequency-domain). For example, the system 100 may apply FFT processing to the time-domain microphone audio data z(n) 212, producing the frequency-domain microphone audio data Z(n, k) 214, where the tone index "k" (e.g., frequency index) ranges from 0 to K and "n" is a frame index ranging from 0 to N. As illustrated in FIG. 2A, the history of the values across iterations is provided by the frame index "n", which ranges from 1 to N and represents a series of samples over time.

Figure 2B:
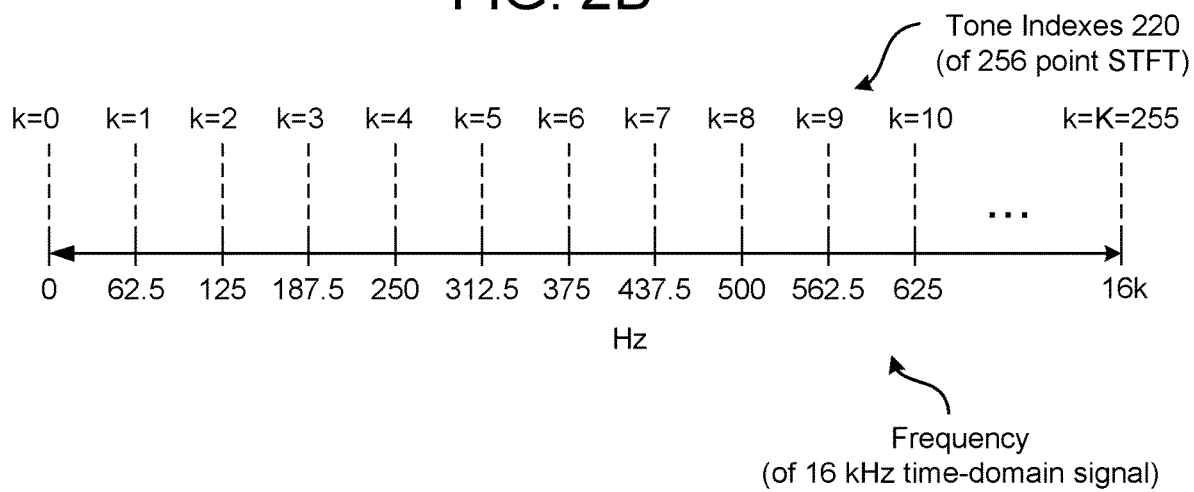

FIG. 2B illustrates an example of performing a K-point FFT on a time-domain signal. As illustrated in FIG. 2B, if a 256-point FFT is performed on a 16 kHz time-domain signal, the output is 256 complex numbers, where each complex number corresponds to a value at a frequency in increments of 16 kHz/256, such that there is 125 Hz between points, with point 0 corresponding to 0 Hz and point 255 corresponding to 16 kHz. As illustrated in FIG. 2B, each tone index 220 in the 256-point FFT corresponds to a frequency range (e.g., subband) in the 16 kHz time-domain signal. While FIG. 2B illustrates the frequency range being divided into 256 different frequency ranges (e.g., tone indexes), the disclosure is not limited thereto and the system 100 may divide the frequency range into K different frequency ranges (e.g., K indicates an FFT size). While FIG. 2B illustrates the tone index 220 being generated using a Fast Fourier Transform (FFT), the disclosure is not limited thereto. Instead, the tone index 220 may be generated using Short-Time Fourier Transform (STFT), generalized Discrete Fourier Transform (DFT) and/or other transforms known to one of skill in the art (e.g., discrete cosine transform, non-uniform filter bank, etc.).

Figure 2C:
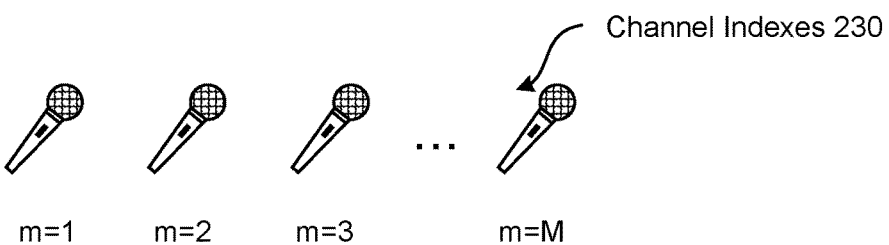

The system 100 may include multiple microphones, with a first channel m corresponding to a first microphone (e.g., m=1), a second channel (m+1) corresponding to a second microphone (e.g., m=2), and so on until a final channel (M) that corresponds to final microphone (e.g., m=M). FIG. 2C illustrates channel indexes 230 including a plurality of channels from channel m=1 to channel m=M. While an individual device 110 may include multiple microphones, during a communication session the device 110 may select a single microphone and generate microphone audio data using the single microphone. However, while many drawings illustrate a single channel (e.g., one microphone), the disclosure is not limited thereto and the number of channels may vary. For the purposes of discussion, an example of system 100 may include "M" microphones (M≥1) for hands free near-end/far-end distant speech recognition applications.

While FIGS. 2A-2D are described with reference to the microphone audio data z(t), the disclosure is not limited thereto and the same techniques apply to the playback audio data x(t) (e.g., reference audio data) without departing from the disclosure. Thus, playback audio data x(t) indicates a specific time index t from a series of samples in the time-domain, playback audio data x(n) indicates a specific frame index n from series of frames in the time-domain, and playback audio data X(n, k) indicates a specific frame index n and frequency index k from a series of frames in the frequency-domain.

Prior to converting the microphone audio data z(n) and the playback audio data x(n) to the frequency-domain, the device 110 may first perform time-alignment to align the playback audio data x(n) with the microphone audio data z(n). For example, due to nonlinearities and variable delays associated with sending the playback audio data x(n) to loudspeaker(s) using a wired and/or wireless connection, the playback audio data x(n) may not be synchronized with the microphone audio data z(n). This lack of synchronization may be due to a propagation delay (e.g., fixed time delay) between the playback audio data x(n) and the microphone audio data z(n), clock jitter and/or clock skew (e.g., difference in sampling frequencies between the device 110 and the loudspeaker(s)), dropped packets (e.g., missing samples), and/or other variable delays.

To perform the time alignment, the device 110 may adjust the playback audio data x(n) to match the microphone audio data z(n). For example, the device 110 may adjust an offset between the playback audio data x(n) and the microphone audio data z(n) (e.g., adjust for propagation delay), may add/subtract samples and/or frames from the playback audio data x(n) (e.g., adjust for drift), and/or the like. In some examples, the device 110 may modify both the microphone audio data z(n) and the playback audio data x(n) in order to synchronize the microphone audio data z(n) and the playback audio data x(n). However, performing nonlinear modifications to the microphone audio data z(n) results in first microphone audio data z1(n) associated with a first microphone to no longer be synchronized with second microphone audio data z2(n) associated with a second microphone. Thus, the device 110 may instead modify only the playback audio data x(n) so that the playback audio data x(n) is synchronized with the first microphone audio data z1(n).

While FIG. 2A illustrates the frame indexes 218 as a series of distinct audio frames, the disclosure is not limited thereto. In some examples, the device 110 may process overlapping audio frames and/or perform calculations using overlapping time windows without departing from the disclosure. For example, a first audio frame may overlap a second audio frame by a certain amount (e.g., 80%), such that variations between subsequent audio frames are reduced. Additionally or alternatively, the first audio frame and the second audio frame may be distinct without overlapping, but the device 110 may determine power value calculations using overlapping audio frames. For example, a first power value calculation associated with the first audio frame may be calculated using a first portion of audio data (e.g., first audio frame and n previous audio frames) corresponding to a fixed time window, while a second power calculation associated with the second audio frame may be calculated using a second portion of the audio data (e.g., second audio frame, first audio frame, and n−1 previous audio frames) corresponding to the fixed time window. Thus, subsequent power calculations include n overlapping audio frames.

Figure 2D:
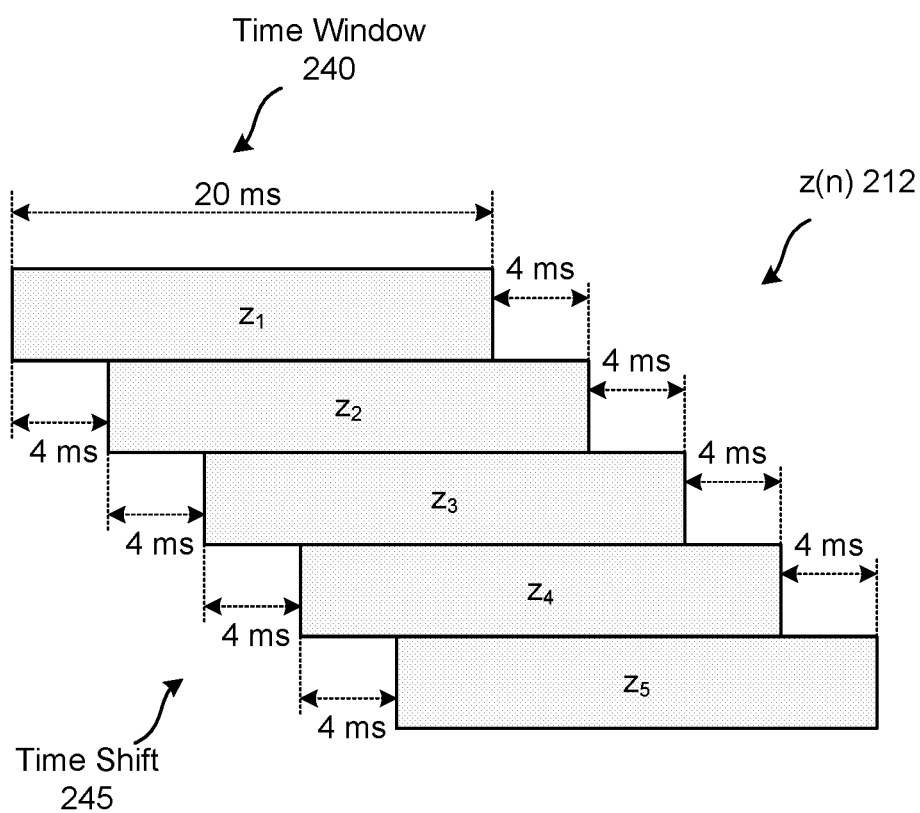

As illustrated in FIG. 2D, overlapping audio frames may be represented as overlapping audio data associated with a time window 240 (e.g., 20 ms) and a time shift 245 (e.g., 4 ms) between neighboring audio frames. For example, a first audio frame x1 may extend from 0 ms to 20 ms, a second audio frame x2 may extend from 4 ms to 24 ms, a third audio frame x3 may extend from 8 ms to 28 ms, and so on. Thus, the audio frames overlap by 80%, although the disclosure is not limited thereto and the time window 240 and the time shift 245 may vary without departing from the disclosure.

Figure 3:
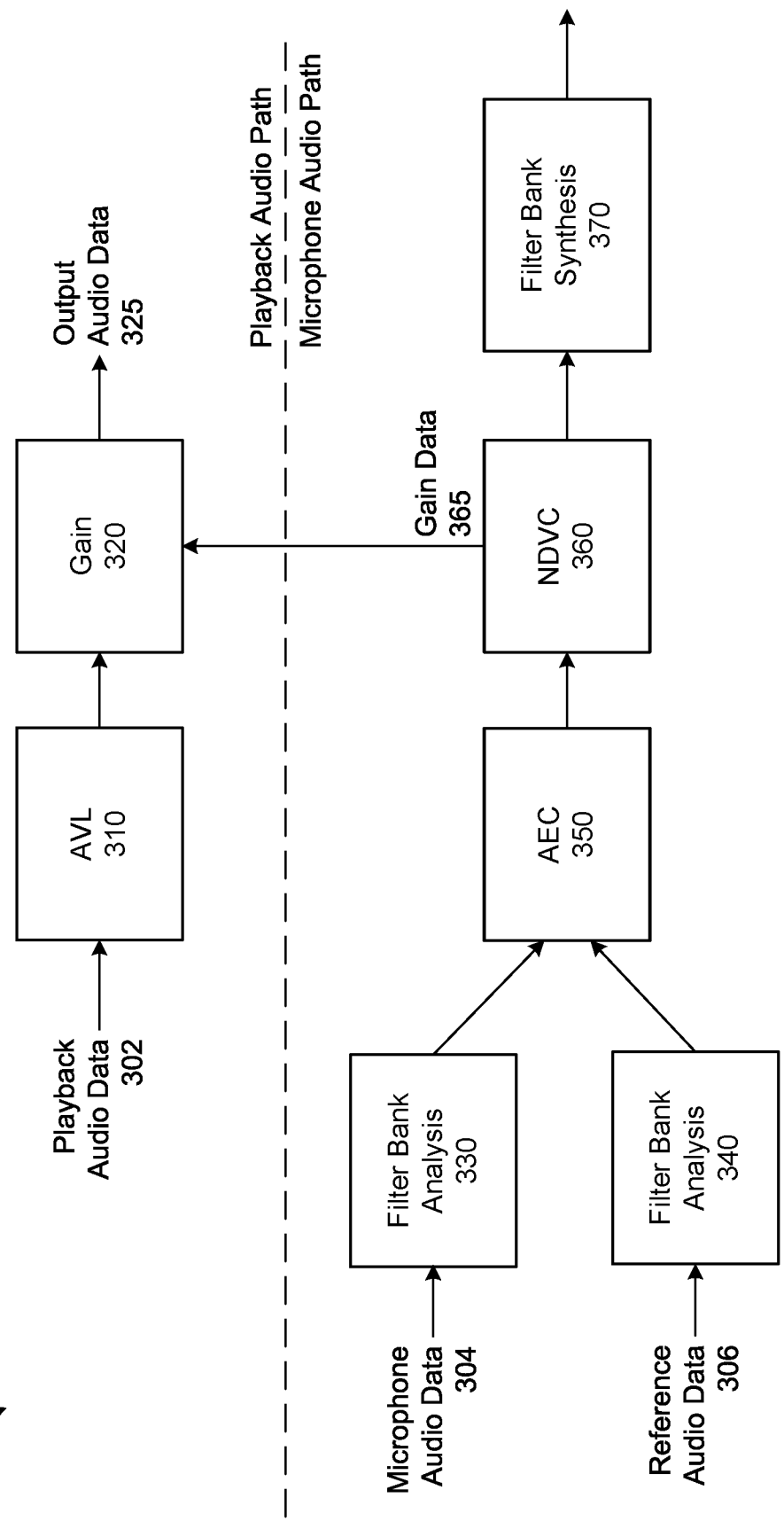
FIG. 3 illustrates an example component diagram for performing noise dependent volume control according to embodiments of the present disclosure.

FIG. 3 illustrates an example component diagram for performing noise dependent volume control according to embodiments of the present disclosure. As illustrated in FIG. 3, noise dependent volume control (NDVC) 300 may process playback audio data 302 to generate output audio data 325. For example, an automatic volume leveling (AVL) component may receive the playback audio data 302 and perform AVL processing to generate leveled audio data, while a gain component 320 may apply a plurality of gain values (e.g., gain data 365) to the leveled audio data to generate the output audio data 325.

As illustrated in FIG. 3, the AVL component 310 and the gain component 320 are included as part of a playback audio path that generates playback audio (e.g., output audio) using one or more loudspeaker(s) associated with the device 110. In some examples, the device 110 may receive first audio data from a remote device and/or remote system (not illustrated) while (i) playing media content (e.g., music, audio clip, video clip, television show, movie, and/or the like), (ii) participating in a communication session, (iii) processing a voice command, and/or the like, although the disclosure is not limited thereto. After receiving the first audio data, the device 110 may use one or more components (not illustrated) to process the first audio data and generate the playback audio data 302. For example, the device 110 may perform dynamic range compression, upward compression (e.g., expansion), downward compression, audio filtering or smoothing, volume control (e.g., embedded volume control), equalization (e.g., apply different gain values to different frequency bands), multi-band compression/limiting (e.g., maximize loudness and bass, prevent loudspeaker audio from overflow and clipping, and/or reduce total harmonic distortion that is unique to one or more loudspeaker(s) associated with the device 110), and/or additional processing without departing from the disclosure.

The AVL component 310 may process the playback audio data 302 to perform AVL processing and generate the leveled audio data. As used herein, AVL processing and/or automatic volume control and leveling (AVCL) correspond to controlling an output energy level for varying input energy levels. For example, the device 110 may measure an average amplitude of the input energy levels associated with a first time range of the input audio data and may dynamically adjust the input-to-output gain to a suitable value to generate output audio data at a desired output energy level (e.g., desired output average amplitude). The average amplitude can be a simple measurement of average power, such as a root mean square (RMS) value that is defined as a square root of mean square (e.g., arithmetic mean of squares of a set of numbers), which may also be referred to as a quadratic mean. Thus, AVL may be correspond to loudness normalization, variable-gain amplification, automatic gain control (AGC), and/or automatic volume control (AVC) without departing from the disclosure. Performing AVL processing results in dynamic range compression, as AVL processing reduces the volume of loud sounds and amplifies quiet sounds, thus reducing or compressing the dynamic range of the output audio data relative to the input audio data.

As will be described in greater detail below, the gain component 320 may then process the leveled audio data using the gain data 365 to generate the output audio data 325. In some examples, the device 110 may send the output audio data 325 to the one or more loudspeaker(s) to generate the playback audio. However, the disclosure is not limited thereto, and in other examples the device 110 may perform additional processing (e.g., volume control, equalization, multi-band compression/limiting, and/or the like) prior to generating the playback audio.

While the playback audio path processes playback audio data and generates the playback audio that is output to the user 5, a microphone audio path generates and processes microphone audio data representing acoustic noises detected by the device 110. For example, the device 110 may capture input audio by generating microphone audio data 304 using one or more microphones. In some examples, the device 110 may process the microphone audio data 304 to generate second audio data and may send the second audio data to the remote device and/or remote system via the network(s) 199. However, the disclosure is not limited thereto, and in other examples the device 110 may process the microphone audio data 304 locally without departing from the disclosure.

As illustrated in FIG. 3, a noise dependent volume control (NDVC) component 360 may be included within the microphone audio path and may generate the plurality of gain values (e.g., gain data 365) based on the microphone audio data 304. In some examples, the NDVC component 360 may estimate a noise floor associated with ambient noise in the environment 20 and may determine the gain data 365 to compensate for the estimated noise floor. For example, a quiet environment may correspond to a low estimated noise floor and therefore lower gain values, whereas a loud environment may correspond to a high estimated noise floor and therefore higher gain values.

In the example illustrated in FIG. 3, the NDVC component 360 generates the gain data 365 using an output of an acoustic echo cancellation (AEC) component 350. In some examples, the AEC component 350 may receive microphone audio data and reference audio data and perform echo cancellation to generate isolated audio data. For example, the AEC component 350 may generate an estimated echo signal using the reference audio data and then subtract the estimated echo signal from the microphone audio data to generate the isolated audio data. Thus, the isolated audio data represents speech, acoustic noise, and other ambient sounds present in the environment, but a representation of an echo signal corresponding to the playback audio generated by the loudspeaker(s) is attenuated. Using the isolated audio data, the NDVC 360 may generate the plurality of gain values (e.g., gain data 365) based on the ambient noise that may interfere with the user's ability to perceive the playback audio.

In the example illustrated in FIG. 3, the AEC component 350 performs echo cancellation in a frequency domain. For example, a first filter bank analysis component 330 may receive microphone audio data 304 in a time domain and may convert from the time domain to the frequency domain. In some examples, the first filter bank analysis component 330 may generate audio data having a plurality of subbands (e.g., frequency ranges) associated with each channel (e.g., individual microphone) of the microphone audio data 304. Similarly, a second filter bank analysis component 340 may receive reference audio data 306 in the time domain and may convert from the time domain to the frequency domain. Thus, the second filter bank analysis component 340 may generate audio data having a plurality of subbands (e.g., frequency ranges) associated with each individual channel of the reference audio data 306. However, the disclosure is not limited thereto and in some examples the AEC component 350 may perform echo cancellation in the time domain without departing from the disclosure.

In some examples, the reference audio data 306 may correspond to the playback audio generated by the playback audio path. For example, the reference audio data 306 may correspond to a delayed version of the output audio data 325 without departing from the disclosure. Thus, the AEC component 350 may perform echo cancellation using the output audio data 325 that was used to generate the playback audio. However, the disclosure is not limited thereto and in other examples the reference audio data 306 may correspond to a microphone signal without departing from the disclosure. For example, the reference audio data 306 may correspond to audio data generated by reference microphone(s), a portion of the microphone audio data 304, and/or the like, although the disclosure is not limited thereto.

In some examples, the playback audio data 302 and the output audio data 325 have a first sampling rate (e.g., 48 kHz), while the microphone audio data 304 has a second sampling rate (e.g., 16 kHz). In order to perform echo cancellation using the microphone audio data 304, in some examples the device 110 may generate the reference audio data 306 such that it has the second sampling rate. For example, the device 110 may delay the output audio data 325 and perform downsampling to generate the reference audio data 306, although the disclosure is not limited thereto.

After processing the isolated audio data to generate the gain data 365, the NDVC component 360 may output the isolated audio data to a filter bank synthesis component 370. The filter bank synthesis component 370 may be configured to process the isolated audio data in the frequency domain and generate second audio data in the time domain. The device 110 may perform additional processing to the second audio data and/or send the second audio data to a remote device and/or remote system without departing from the disclosure.

Figure 4:
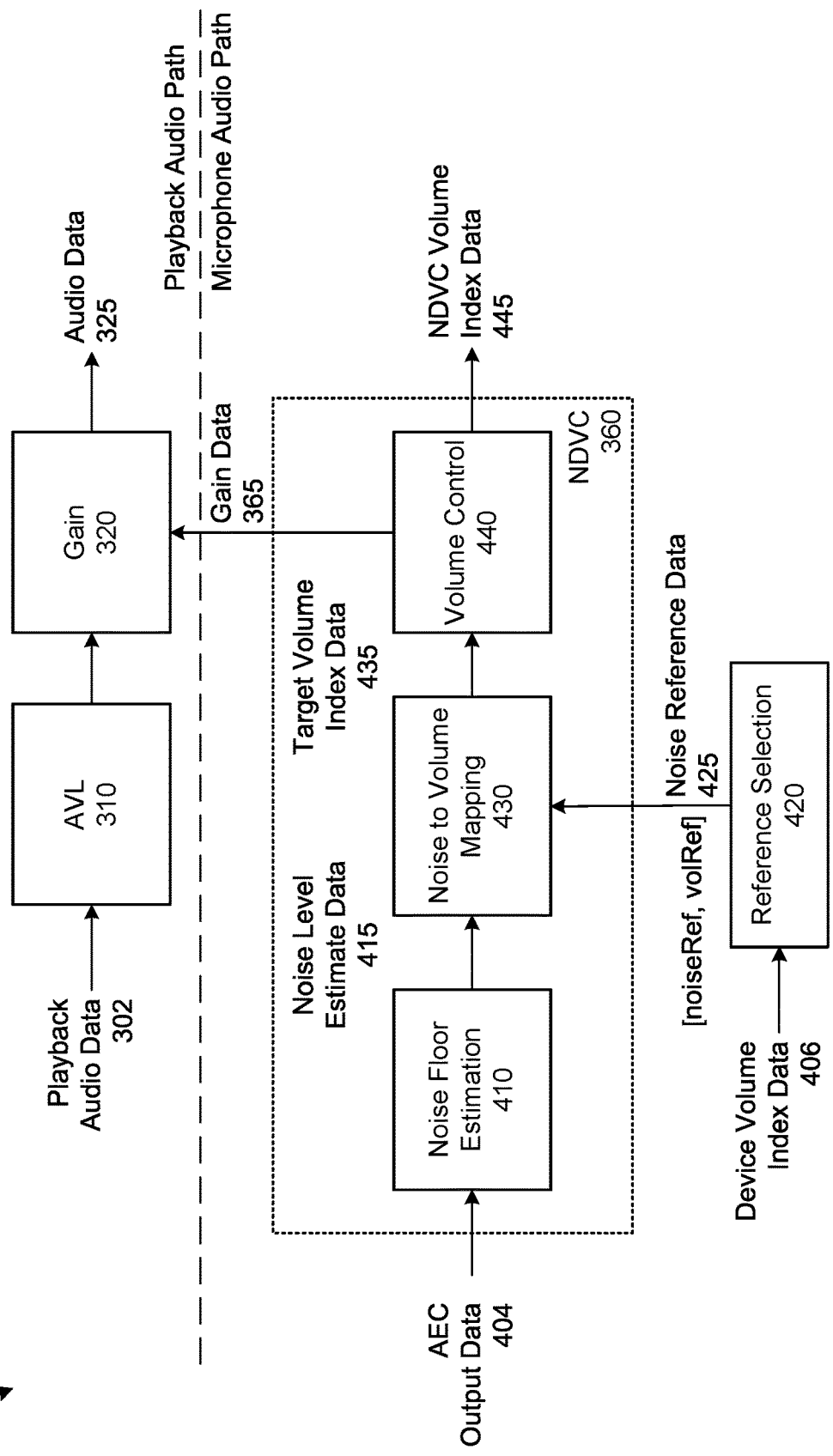
FIG. 4 illustrates an example component diagram for performing noise dependent volume control according to embodiments of the present disclosure.

FIG. 4 illustrates an example component diagram for performing noise dependent volume control according to embodiments of the present disclosure. While the playback audio path illustrated in FIG. 4 is identical to the one described above with regard to FIG. 3, FIG. 4 illustrates a detailed example of the NDVC component 360 generating the gain data 365. For example, the device 110 may perform noise dependent volume control (NDVC) 400 using a noise floor estimation component 410, a noise to volume mapping component 430, and a volume control component 440.

As illustrated in FIG. 4, the noise floor estimation component 410 may receive AEC output data 404 from the AEC component 350 and may generate noise level estimate data 415 that tracks an estimated noise floor. In some examples, the noise floor estimation component 410 may calculate a frame energy value for an individual audio frame of the AEC output data 404 and use the frame energy value to update the estimated noise floor value. For example, the noise floor estimation component 410 may apply a leaky integrator to smooth an average of the frame energy values over time and ignore transient noises (e.g., a door slamming, coughing, clapping, etc.). Thus, the estimated noise floor value tracks continuous sounds that increase ambient noise and may interfere with the user's perception of the playback audio. In some examples, the noise floor estimation component 410 may determine the frame energy value using a specific frequency range (e.g., desired frequency bands, such as 400 Hz to 8 kHz) of the AEC output data 404, such that the estimated noise floor value corresponds to energy represented in this frequency range. As used herein, the estimated noise floor value may refer to an estimated noise floor value, an estimated noise floor level, an estimated noise value, an estimated noise level, and/or the like without departing from the disclosure.

To determine the estimated noise floor, the noise floor estimation component 410 may apply different time constants for different conditions based on a current frame energy value. To illustrate an example, the noise floor estimation component 410 may apply a slow time constant for attack conditions (e.g., 4 second attack time), which occur when a current frame energy value exceeds the estimated noise floor value. In contrast, the noise floor estimation component 410 may apply a fast time constant for release conditions (e.g., 0.1 second release time), which occur when the current frame energy value is below the estimated noise floor value. Selecting the attack time to be significantly longer than the release time may reduce the impact of transient sounds (e.g., ignore transient noises, such as a door slamming, coughing, clapping, etc.) while accurately tracking the long-term noise floor. However, in order to be responsive to continuous noises, the noise floor estimation component 410 may shorten the attack time adaptively if the attack conditions persist. For example, the noise floor estimation component 410 may apply a first attack time (e.g., 4 seconds) for a first duration of time (e.g., 2 seconds), but if the attack conditions persist for longer than the first duration of time, the noise floor estimation component 410 may shorten the attack constant and track the noise floor more quickly. In some examples, the noise floor estimation component 410 may instantly increase to a second attack time (e.g., 2 seconds) after the first duration of time. However, the disclosure is not limited thereto, and in other examples the noise floor estimation component 410 may transition from the first attack time to the second attack time over a plurality of audio frames without departing from the disclosure.

In order to accurately track the estimated noise floor, in some examples the noise floor estimation component 410 may ignore speech activity. For example, the device 110 may include a voice activity detection (VAD) component configured to detect speech and identify whether speech is represented in the AEC output data 404. If the VAD component determines that speech is detected in a particular audio frame, the noise floor estimation component 410 may freeze the estimated noise floor value by ignoring the frame energy value associated with the audio frame. Thus, the noise floor estimation component 410 only updates the estimated noise floor value when speech activity is not detected. In some examples, the device 110 may distinguish between speech activity associated with a user (e.g., human generated speech, such as an utterance from the user 5) and speech activity corresponding to a loudspeaker (e.g., machine generated speech, such as dialog output by a television). Thus, the noise floor estimation component 410 may selectively freeze the estimated noise floor value when human generated speech is detected, but may continue to update the estimated noise floor value based on machine generated speech (e.g., consider dialog output by the television to be a noise signal).

In some examples, the noise floor estimation component 410 may determine a single estimated noise floor value for each audio frame, and the noise level estimate data 415 may comprise a single estimated noise floor value or a plurality of estimated noise floor values without departing from the disclosure. For example, if the playback audio data 302 has the first sampling rate (e.g., 48 kHz), the AEC output data 404 has the second sampling rate (e.g., 16 kHz), and an audio frame has a first duration (e.g., 8 ms), an individual audio frame may correspond to 384 samples of the playback audio data 302, 128 samples of the AEC output data 404, and a single estimated noise floor value. The noise floor estimation component 410 may output the noise level estimate data 415 to the noise to volume mapping component 430 as individual estimated noise floor values without departing from the disclosure.

As illustrated in FIG. 4, a reference selection component 420 may receive device volume index data 406 and may generate noise reference data 425. In some examples, the reference selection component 420 may generate noise reference data 425 that indicates a noise reference value and a volume reference value (e.g., [noiseRef, volRef]). For example, the reference selection component 420 may calculate the noise reference value and the volume reference value in decibels (dB), although the disclosure is not limited thereto.

The reference selection component 420 may determine the volume reference value based on the device volume index data 406. For example, the device volume index data 406 may indicate a first volume index value (e.g., current volume index) that the device 110 is using to generate the playback audio. However, the first volume index value may represent a playback volume using a different convention than what is used by the volume mapping component 430. For example, the first volume index value may indicate a percentage value (e.g., 0-100%) or an integer value (e.g., 0-100), although the disclosure is not limited thereto. In contrast, the volume mapping component 430 may indicate a decibel (dB) value, although the disclosure is not limited thereto.

The reference selection component 420 may also determine a noise reference value (noiseRef). As will be described in greater detail below with regard to FIG. 7, the device 110 may determine the noise reference value differently depending on a current mode of operation (e.g., configuration settings, user preferences, and/or the like). In some examples, the device 110 may determine the noise reference value using three different modes of operation, with each mode selecting a different noise level as the noise reference value for volume adaptation. For example, a first mode may determine the noise reference value based on a noise level at the time that the user most recently changed a volume level of the device 110, a second mode may determine the noise reference value based on an initial noise level for a current session, and a third mode may determine the noise reference value based on a fixed noise level (e.g., calibration noise level) determined for the device 110.

While the example described above and illustrated in FIG. 7 refers to three different modes of operation, the disclosure is not limited thereto and the device 110 may determine the noise reference value using any number of modes of operations without departing from the disclosure. For example, the device 110 may determine the noise reference value using a mode of operation not described above without departing from the disclosure. Additionally or alternatively, the device 110 may be configured to determine the noise reference value using a single mode of operation without departing from the disclosure. Regardless of how the device 110 determines the noise reference value (e.g., reference noise value), the reference selection component 420 may generate the noise reference data 425 that includes the noise reference value and the volume reference value and may output the noise reference data 425 to the noise to volume mapping component 430.

As illustrated in FIG. 4, the noise to volume mapping component 430 may receive the noise level estimate data 415 from the noise floor estimation component 410 and the noise reference data 425 from the reference selection component 420. Based on these inputs, the noise to volume mapping component 430 may determine a desired volume index and generate target volume index data 435. For example, the noise to volume mapping component 430 may determine a noise-to-volume function to estimate a noise compensation value, may use the noise compensation value to determine a gain value to apply to compensate for the noise, and may use the gain value and a first volume index value (e.g., current volume index) to determine a second volume index value (e.g., desired volume index), although the disclosure is not limited thereto.

In some examples, the noise to volume mapping component 430 may simulate volume changes using quantized values. For example, while the device 110 may calculate the gain value and/or the second volume index value using continuous values represented in decibels (dB), the device 110 may further stabilize volume jitter and oscillations by quantizing these continuous gain values using a quantized lookup table. To illustrate an example, the device 110 may only increase from the first volume index value to the second volume index value if the gain value is sufficiently large to justify this transition. Thus, the device 110 may ignore smaller gain values as not being sufficient to jump to the next quantized value in the quantized lookup table, further stabilizing the output volume and preventing undesirable fluctuations that may occur if the continuous values are used to select the second volume index value.

FIG. 5 illustrates an example of a quantized volume table according to embodiments of the present disclosure. As illustrated in FIG. 5, a volume table 500 may include a first number of volume indexes (e.g., 0-30), with each volume index indicating a corresponding quantized value represented in decibels. For example, a first volume index (e.g., 0) corresponds to a first value (e.g., 0 dB), a second volume index (e.g., 1) corresponds to a second value (e.g., −2 dB), a third volume index (e.g., 2) corresponds to a third value (−4 dB), and so on until a $29^{th}$ volume index (e.g., 28) corresponds to a $29^{th}$ value (e.g., −66 dB), a $30^{th}$ volume index corresponds to a $30^{th}$ value (e.g., −70 dB), and a $31^{st}$ volume index corresponds to a $31^{st}$ value (e.g., −200 dB). Thus, the volume table 500 includes a range of quantized volume values from 0 dB down to −200 dB. However, the disclosure is not limited thereto and the device 110 may vary a number of volume indexes, the values associated with each volume index, and/or the like without departing from the disclosure. Using the volume table 500, the device 110 may only increase from a current volume index to a target volume index if the gain value exceeds the difference between the current volume index and the target volume index.

Figure 6:
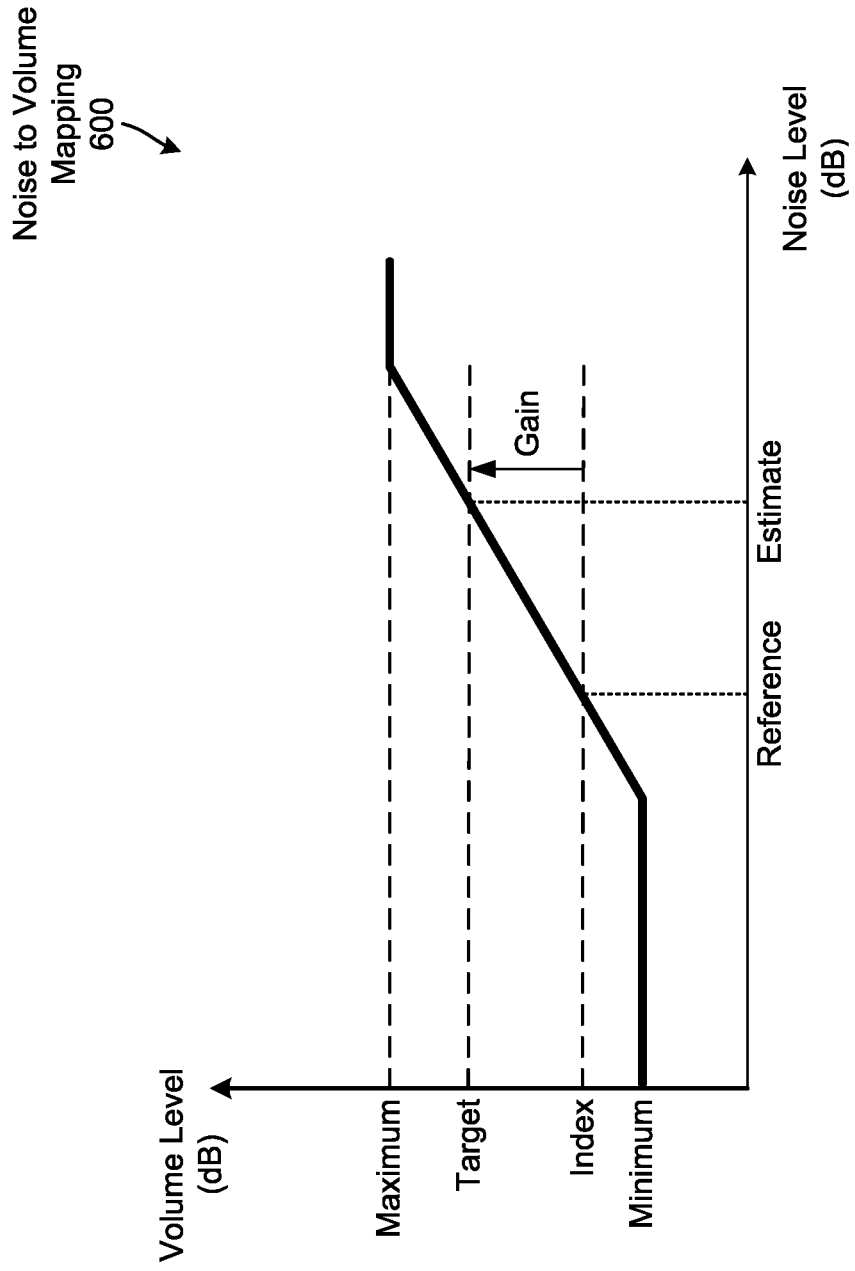
FIG. 6 illustrates an example of noise to volume mapping according to embodiments of the present disclosure.

FIG. 6 illustrates an example of noise to volume mapping according to embodiments of the present disclosure. As described above, the noise to volume mapping component 430 may determine a noise-to-volume function to estimate a noise compensation value. As illustrated in FIG. 6, noise to volume mapping 600 depicts a noise level (measured in dB) along a horizontal axis and a volume level (measured in dB) along a vertical axis, with the volume level restricted by a minimum volume level (e.g., Minimum) and a maximum volume level (e.g., Maximum). Thus, the volume level is never set below the minimum volume level and never exceeds the maximum volume level. Within this range, however, the volume level is represented by the noise-to-volume function, which is a line that passes through a reference point (e.g., [noiseRef, volumeRef]) and has a particular slope (e.g., coefficient value). As described above, the noise reference data 425 may set the reference point that defines the noise-to-volume mapping, although the disclosure is not limited thereto.

In the noise to volume mapping 600 example illustrated in FIG. 6, the reference point (e.g., [noiseRef, volumeRef]) is illustrated as a noise reference value (e.g., Reference) and a current volume index value (e.g., Index). The noise compensation value corresponds to an increase in the estimated noise floor value (e.g., Estimate) relative to the noise reference value. For example, the device 110 may determine the noise compensation value by determining a difference between the estimated noise floor value and the noise reference value (e.g., ΔN=Estimate−Reference).

Using the noise compensation value (e.g., $\Delta N$) and the coefficient value (e.g., m), the device 110 may determine the gain value (e.g., Gain) that may be used to compensate for the noise (e.g., Gain=m($\Delta N$)). For example, the device 110 may determine the target volume index value (e.g., Target) by adding the gain value to the current volume index value (e.g., Target=Index+Gain). Thus, the device 110 may generate the playback audio using the target volume index value in order to compensate for the noise represented by the estimated noise floor value.

In some examples, the device 110 may set a maximum gain value to control a rate at which the playback volume increases or decreases. For example, the device 110 may limit an absolute value of the gain value to a first value (e.g., 8 dB), such that any positive or negative gain values are capped by the first value (e.g., set equal to +/−8 dB). Thus, if the playback volume increases by a gain value over 8 dB, the device 110 may set the gain value equal to +8 dB, whereas if the playback volume decreases by a gain value below −8 dB, the device 110 may set the gain value equal to −8 dB. However, the disclosure is not limited thereto and the device 110 may set the gain value equal to other values (e.g., +/−4 dB) without departing from the disclosure. Additionally or alternatively, the device 110 may set a minimum gain value and may ignore gain values below the minimum gain value. For example, the device 110 may ignore any gain values having an absolute value below a second value (e.g., 1 dB), such that gain values within a minimum range (e.g., −1 dB to 1 dB) are ignored and do not result in a change in volume.

Referring back to FIG. 4, the noise to volume mapping component 430 may generate the target volume index data 435 using the target volume index value determined by the noise to volume mapping 600. In some examples, the target volume index data 435 may include a single target volume index value for each audio frame, although the disclosure is not limited thereto. The noise to volume mapping component 430 may output the target volume index data 435 to the volume control component 440.

The volume control component 440 may process the target volume index data 435 to determine an NDVC volume index data 445 and corresponding gain data 365. In some examples, the volume control component 440 may determine whether the target volume index data 435 corresponds to a change in the playback volume and, if so, whether the requested volume change is executed by the device 110. For example, the volume control component 440 may control volume changes based on a set of constraints, which include a volume hold time, a hysteresis time, a minimum volume index, a maximum volume index, and/or the like.

In some examples, the volume hold time may indicate a first duration of time (e.g., 0.75 seconds) and the volume control component 440 may use the volume hold time to prevent frequent volume changes. For example, after each volume change, the volume control component 440 may prevent any subsequent volume changes for the first duration of time. Similarly, the volume control component 440 may use the hysteresis time to prevent the volume level from changing directions (e.g., reversing directions) for a second duration of time (e.g., 4 seconds). For example, after a first volume change to increase the volume level (e.g., positive volume change), the volume control component 440 may make a second volume change to increase the volume level after the first duration of time has elapsed, but may not make a second volume change to decrease the volume level until after the second duration of time has elapsed. Similarly, after a third volume change to decrease the volume level (e.g., negative volume change), the volume control component 440 may make a fourth volume change to decrease the volume level after the first duration of time has elapsed, but may not make a fourth volume change to increase the volume level until after the second duration of time has elapsed. Thus, the hold time reduces a total number of volume changes, whereas the hysteresis time reduces a frequency at which the volume changes direction.

In some examples, the device 110 may also use the minimum volume index and the maximum volume index to control volume adaptation. For example, the minimum volume index (e.g., −70 dB) may be used to prevent spurious volume changes based on speech activity or other intermittent noises in a quiet environment. Similarly, the maximum volume index may be used to prevent volume changes in a loud environment, even if the estimated noise floor varies over time.

While the noise to volume mapping component 430 includes constraints that modify a target volume index and/or a change in the amount of gain (e.g., limiting the change in the amount of gain to a maximum value, ignoring small changes in the amount of gain, etc.), the constraints used by the volume control component 440 control whether a requested volume change is accepted or not. For example, if the target volume index data 435 indicates a new target volume index but the volume control constraints are not satisfied (e.g., a sufficient amount of time has not elapsed since a previous volume change), the volume control component 440 may reject the requested volume change and maintain a current target volume index. Thus, the volume control component 440 may output NDVC volume index data 445 indicating the current target volume index (e.g., based on a previous estimated noise floor) and may output gain data 365 indicating an amount of gain to apply to increase from the current volume index indicated by the device volume index data 406 to the current target volume index indicated by the NDVC volume index data 445.

In contrast, if the target volume index data 435 indicates a new target volume index and all of the volume control constraints are satisfied, the volume control component 440 may accept the requested volume change and set a new target volume index. Thus, the volume control component 440 may output NDVC volume index data 445 indicating the new target volume index (e.g., based on a current estimated noise floor) and may output gain data 365 indicating an amount of gain to apply to increase from the current volume index indicated by the device volume index data 406 to the new target volume index indicated by the NDVC volume index data 445. In some examples, the volume control component 440 may output a volume change notification (e.g., indication of a change in the target volume index), which may be used to indicate the new target volume index to other volume-dependent processes, although the disclosure is not limited thereto.

In some examples, the device 110 may perform additional processing to reduce feedback and/or distortion caused by a positive feedback loop. For example, the device 110 may determine whether there is a correlation between gain values being applied and the estimated noise floor values being measured. If the device 110 determines that the gain values and the estimated noise floor values are increasing at the same time, the device 110 may prevent a potential feedback loop by not increasing the gain value (e.g., maintain a current gain value), freezing the current target volume (e.g., maintain a current volume index), and/or setting the gain value to a fixed value (e.g., 0 dB) for a duration of time.

Figure 7:
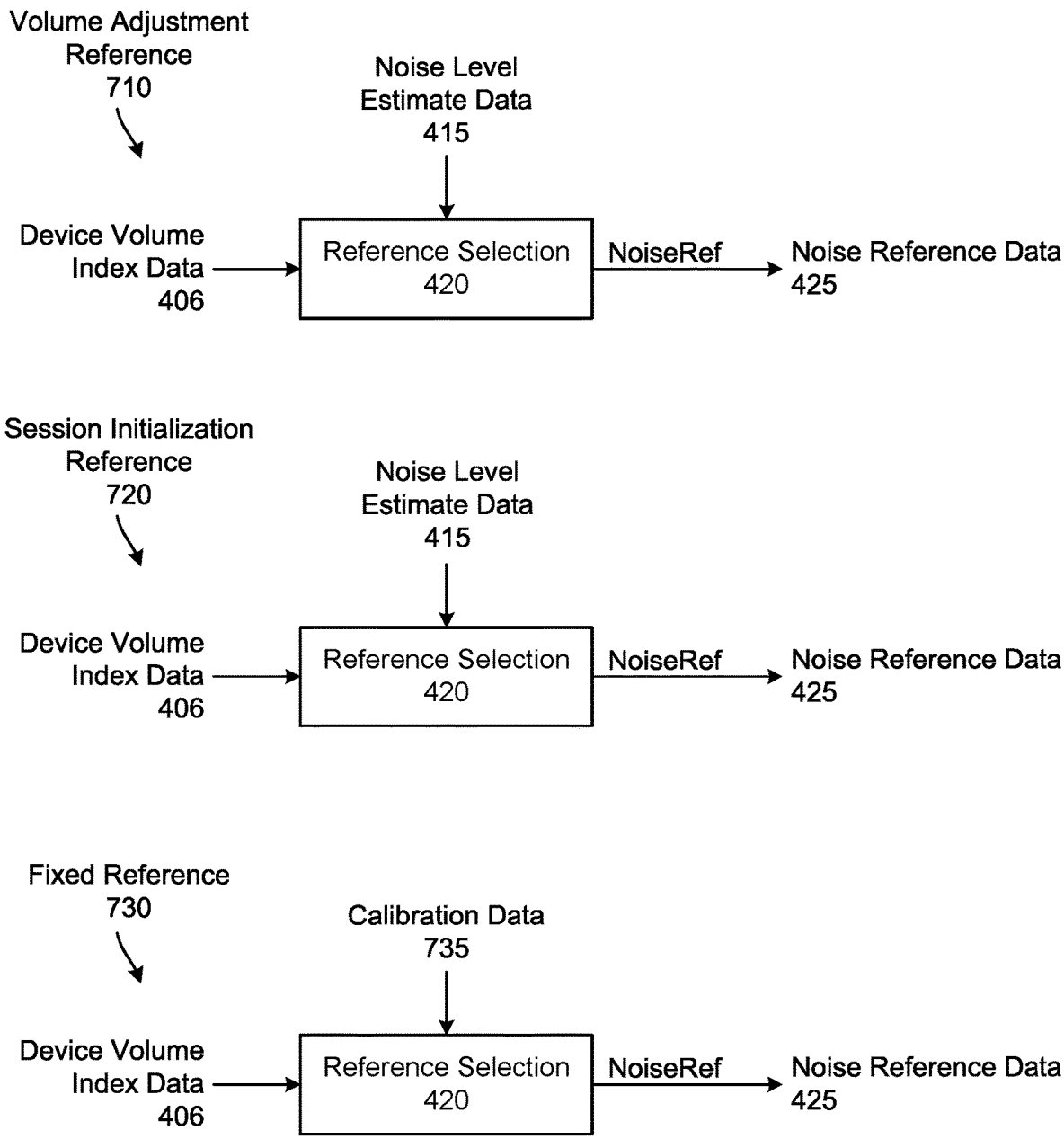
FIG. 7 illustrates example noise references according to embodiments of the present disclosure.

FIG. 7 illustrates example noise references according to embodiments of the present disclosure. As described above, the device 110 may determine the noise reference value differently depending on a current mode of operation (e.g., configuration settings, user preferences, and/or the like). In some examples, the device 110 may determine the noise reference value using three different modes of operation, with each mode selecting a different noise level as the noise reference value for volume adaptation.

As illustrated in FIG. 7, a first mode may correspond to a volume adjustment reference 710 that determines the noise reference value based on a noise level at the time that the user most recently changed a volume level of the device 110. In some examples, in response to receiving a command to change the current volume index, the reference selection component 420 may determine a current estimated noise floor value and set the current estimated noise floor value as the noise reference value. For example, the reference selection component 420 may detect changes in the current volume index based on the device volume index data 406. When a change in the current volume index is detected, the reference selection component 420 may determine the current estimated noise floor value using the noise level estimate data 415 and store the current estimated noise floor value as the noise reference value. Thus, the reference selection component 420 may generate noise reference data 425 indicating this noise reference value until a subsequent request to change the volume level.

In contrast, a second mode may correspond to a session initialization reference 720 that determines the noise reference value based on an initial noise level for a current session. For example, during an initialization stage of a current session, the reference selection component 420 may determine a first estimated noise floor value using the noise level estimate data 415 and may set the first estimated noise floor value as the noise reference value. Thus, the reference selection component 420 may generate noise reference data 425 indicating this noise reference value for the duration of the current session.

As used herein, a current session corresponds to a period of time during which the device 110 is consistently and/or continuously generating playback audio. For example, the user may input a first command instructing the device 110 to generate playback audio, beginning a first session. The device 110 may continue generating playback audio associated with the first command and/or subsequent commands until either (i) the device 110 finishes outputting requested media content without receiving a subsequent command for a duration of time or (ii) the user inputs a second command instructing the device 110 to stop generating the playback audio. When either of these conditions occur, the first session ends and the reference selection component 420 may stop using the first estimated noise floor value as the noise reference value. For example, if the device 110 later receives a third command to generate playback audio, the third command begins a second session and the reference selection component 420 may determine a second estimated noise floor value and set the second estimated noise floor value as the noise reference value for the duration of the second session.

Finally, a third mode may correspond to a fixed reference 730 that determines the noise reference value based on a fixed noise level (e.g., calibration noise level) determined for the device 110. For example, as part of manufacturing, testing, calibration, and/or the like, the device 110 may generate calibration data 735 and determine a noise reference floor value that indicates a nominal quiet level associated with the microphones of the device 110 in a quiet environment. Thus, the reference selection component 420 may set the noise reference floor value as the noise reference value and may generate noise reference data 425 indicating the noise reference floor value every time the device 110 generates the playback audio.

Figure 8:
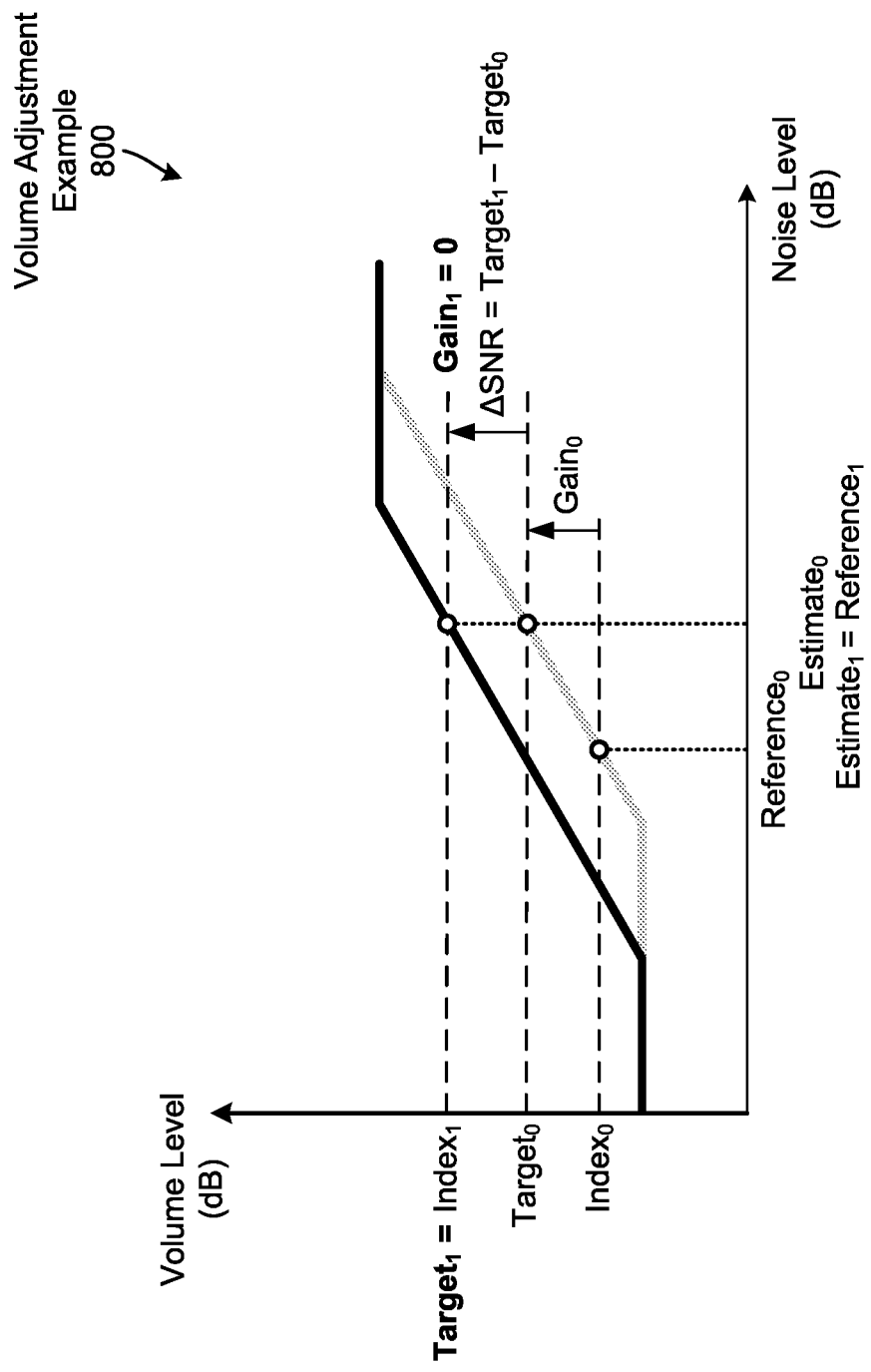
FIG. 8 illustrates an example of performing volume adjustment according to embodiments of the present disclosure.

FIG. 8 illustrates an example of performing volume adjustment according to embodiments of the present disclosure. As described above with regard to FIG. 6, the noise to volume mapping component 430 may determine a noise-to-volume function to estimate a noise compensation value. If the user changes a current volume index value, the noise-to-volume function remains the same but shifts horizontally based on the volume change (e.g., volume reference value). However, the device 110 may generate different gain values and/or target volume index values depending on how the noise reference value is determined.

In the volume adjustment example 800 illustrated in FIG. 8, the reference selection component 420 operates in the first mode corresponding to the volume adjustment reference 710 example described above. Thus, the reference selection component 420 determines the noise reference value based on an estimated noise floor value at the time that the user most recently changed a volume level of the device 110. For example, in response to receiving a command to change the current volume index, the reference selection component 420 may determine a current estimated noise floor value and set the current estimated noise floor value as the new noise reference value. In this mode of operation, when the user chooses to change the volume index, the device 110 interprets the selected volume index as the desired volume index for the current estimated noise floor and does not apply any additional gain.

As illustrated in FIG. 8, the volume adjustment example 800 illustrates a first noise-to-volume function associated with a first volume index value (e.g., $Index_0$), which is represented as a gray line that passes through a first reference point (e.g., [$Reference_0$, $Index_0$]). As described above, the reference selection component 420 may set the first reference point that defines the first noise-to-volume function, although the disclosure is not limited thereto. In this example, the device 110 (i) received a first input selecting the first volume index value (e.g., $Index_0$), (ii) determined an estimated noise floor during a first time range after receiving the first input, and (iii) set the estimated noise floor as a first noise reference value (e.g., $Reference_0$).

After a period of time, the device 110 may determine a first estimated noise floor value (e.g., $Estimate_0$) that is increased relative to the first noise reference value (e.g., $Reference_0$), resulting in a first noise compensation value (e.g., $\Delta N_0$). For example, the device 110 may determine the first noise compensation value by determining a first difference between the first estimated noise floor value and the first noise reference value (e.g., $\Delta N_0 = Estimate_0 - Reference_0$). Using the first noise compensation value (e.g., $\Delta N_0$) and the coefficient value (e.g., m), the device 110 may determine a first gain value (e.g., $Gain_0$) that may be used to compensate for the noise (e.g., $Gain_0 = m(\Delta N_0)$). For example, the device 110 may determine a first target volume index value (e.g., $Target_0$) by adding the first gain value to the first volume index value (e.g., $Target_0 = Index_0 + Gain_0$). Thus, the device 110 may generate the playback audio using the first target volume index value (e.g., $Target_0$) in order to compensate for the noise represented by the first estimated noise floor value.

During a second time range, the device 110 may receive a second input selecting a second volume index value (e.g., Index$_1$). In response, the device 110 may determine a second estimated noise floor (e.g., Estimate$_1$) during the second time range (e.g., after receiving the second input) and may set the second estimated noise floor as a second noise reference value (e.g., Reference$_1$). In this example, the first estimated noise floor value (e.g., Estimate$_0$), the second estimated noise floor value (e.g., Estimate$_1$), and the second noise reference value (e.g., Reference$_1$) are equal. Based on the second volume index value and the second noise reference value, the device 110 may determine a second noise-to-volume function, which is represented as a black line that passes through a second reference point (e.g., [Reference$_1$, Index$_1$]).

As the reference selection component 420 sets the second noise reference value (e.g., Reference$_1$) based on the second estimated noise floor (e.g., Estimate$_1$), the device 110 does not apply noise compensation to compensate for the noise present during the second time range. For example, the device 110 may determine a second noise compensation value (e.g., $\Delta N_1$) by determining a second difference between the second estimated noise floor value and the second noise reference value (e.g., $\Delta N_1$=Estimate$_1$–Reference$_1$). As the second estimated noise floor (e.g., Estimate$_1$) and the second noise reference value (e.g., Reference$_1$) are equal, the second noise compensation value is equal to zero (e.g., $\Delta N_1$=$^0$). Thus, a second gain value (e.g., Gain$_1$) that would be used to compensate for the noise is also zero (e.g., Gain$_1$=0). Therefore, the device 110 may determine a second target volume index value (e.g., Target$_1$) that is equal to the second volume index value (e.g., Target$_1$=Index$_1$).

In the volume adjustment example 800 illustrated in FIG. 8, the device 110 generates playback audio using the second target volume index value (e.g., Target$_1$). However, as the device 110 sets the second noise reference value upon receiving the second input, the second target volume index value does not reflect an increase from the first estimated noise floor (e.g., Estimate$_0$) to the second estimated noise floor (e.g., Estimate$_1$). Thus, while the user may perceive an increased signal to noise ratio (e.g., ASNR), the increased SNR only reflects a difference between the target volume index values (e.g., $\Delta$SNR=Target$_1$–Target$_0$) and not a difference between the volume index values (e.g., Index$_1$–Index$_0$).

Figure 9:
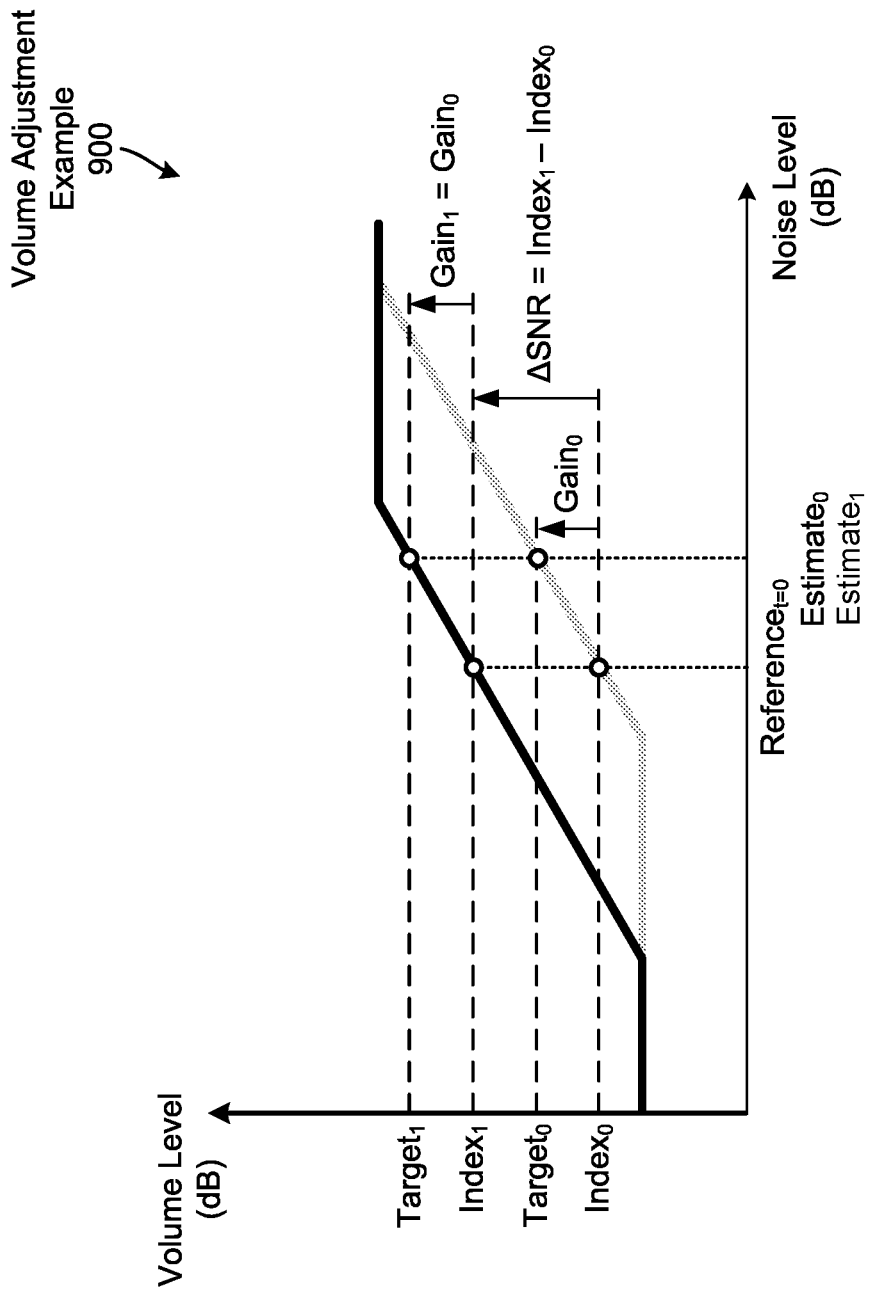
FIG. 9 illustrates an example of performing volume adjustment according to embodiments of the present disclosure.

FIG. 9 illustrates an example of performing volume adjustment according to embodiments of the present disclosure. In the volume adjustment example 900 illustrated in FIG. 9, the reference selection component 420 operates in the second mode corresponding to the session initialization reference 720 example described above. Thus, the reference selection component 420 determines the noise reference value based on an estimated noise floor value at the time that the user first initiated the current session. For example, in response to receiving a command to generate the playback audio, the reference selection component 420 may determine a current estimated noise floor value and set the current estimated noise floor value as the noise reference value. In this mode of operation, when the user subsequently chooses to change the volume index, the device 110 interprets the selected volume index as the desired volume index relative to the noise reference value at the beginning of the session. Thus, the device 110 may control an amount of gain based on the current estimated noise floor relative to this fixed noise reference value.

As illustrated in FIG. 9, the volume adjustment example 900 illustrates a first noise-to-volume function associated with a first volume index value (e.g., Index$_0$), which is represented as a gray line that passes through a first reference point (e.g., [Reference$_0$, Index$_0$]). As described above, the reference selection component 420 may set the first reference point that defines the first noise-to-volume function, although the disclosure is not limited thereto. In this example, the device 110 (i) receives a first input selecting the first volume index value (e.g., Index$_0$), (ii) determines an estimated noise floor during a first time range after receiving the first input, and (iii) sets the estimated noise floor as a noise reference value (e.g., Reference$_{t=0}$).

After a period of time, the device 110 may determine a first estimated noise floor value (e.g., Estimate$_0$) that is increased relative to the noise reference value (e.g., Reference$_{t=0}$), resulting in a first noise compensation value (e.g., $\Delta N_0$). For example, the device 110 may determine the first noise compensation value by determining a first difference between the first estimated noise floor value and the noise reference value (e.g., $\Delta N_0$=Estimate$_0$–Reference$_{t=0}$). Using the first noise compensation value (e.g., $\Delta N_0$) and the coefficient value (e.g., m), the device 110 may determine a first gain value (e.g., Gain$_0$) that may be used to compensate for the noise (e.g., Gain$_0$=m($\Delta N_0$)). For example, the device 110 may determine a first target volume index value (e.g., Target$_0$) by adding the first gain value to the first volume index value (e.g., Target$_0$=Index$_0$+Gain$_0$). Thus, the device 110 may generate the playback audio using the first target volume index value (e.g., Target$_0$) in order to compensate for the noise represented by the first estimated noise floor value.

During a second time range, the device 110 may receive a second input selecting a second volume index value (e.g., Index$_1$). In response, the device 110 may determine a second estimated noise floor (e.g., Estimate$_1$) during the second time range (e.g., after receiving the second input). In this example, the second estimated noise floor value (e.g., Estimate$_1$) is equal to the first estimated noise floor value (e.g., Estimate$_0$). Based on the second volume index value and the noise reference value (e.g., Reference$_{t=0}$), the device 110 may determine a second noise-to-volume function, which is represented as a black line that passes through a second reference point (e.g., [Reference$_{t=0}$, Index$_1$]).

As the reference selection component 420 maintains the noise reference value (e.g., Reference$_{t=0}$) for the entire session, the device 110 may maintain the same noise compensation value after increasing the volume in response to the second input. For example, the device 110 may determine a second noise compensation value (e.g., $\Delta N_1$) by determining a second difference between the second estimated noise floor value and the noise reference value (e.g., $\Delta N_1$=Estimate$_1$–

Reference$_{t=0}$). Using the second noise compensation value (e.g., $\Delta N_1$) and the coefficient value (e.g., m), the device 110 may determine a second gain value (e.g., Gain$_1$) that may be used to compensate for the noise (e.g., Gain$_1$=m($\Delta N_1$)). As the noise reference value (e.g., Reference$_{t=0}$) is maintained for the entire session, the second noise compensation value is equal to the first noise compensation value (e.g., $\Delta N_1$=$\Delta N_0$) and the second gain value is equal to the first gain value (e.g., $\Delta$Gain$_1$=$\Delta$Gain$_0$).

In the volume adjustment example 900 illustrated in FIG. 9, the device 110 may determine a second target volume index value (e.g., Target$_1$) by adding the second gain value to the second volume index value (e.g., Target$_1$=Index$_1$+ Gain$_1$). Thus, the device 110 may generate the playback audio using the second target volume index value (e.g., Target$_1$) in order to compensate for the noise represented by the second estimated noise floor value. As the second target volume index value is set by a combination of the second volume index value and the second gain value, the user may perceive an increased signal to noise ratio (e.g., ΔSNR) based on a difference in the volume index values (e.g., ΔSNR=$Index_1$−$Index_0$).

While the description of FIG. 9 refers to the reference selection component 420 operating in the second mode corresponding to the session initialization reference 720, such that the noise reference value is calculated using an estimated noise floor value at the time that the user first initiated the current session, the disclosure is not limited thereto. In some examples, the reference selection component 420 may operate in the third mode corresponding to the fixed reference 730 without departing from the disclosure. Thus, the reference selection component 420 may determine the noise reference value based on a fixed noise level (e.g., calibration noise level) determined for the device 110. For example, as part of manufacturing, testing, calibration, and/or the like, the device 110 may generate calibration data 735 and determine a noise reference value that indicates a nominal quiet level associated with the microphones of the device 110 in a quiet environment. If the reference selection component 420 operates in the third mode, the description of FIG. 9 remains the same except that the noise reference value does not vary between different sessions (e.g., $Reference_{fixed}$=$Reference_{t=0}$, where t=0 indicates when the device 110 was calibrated).

Figure 10:
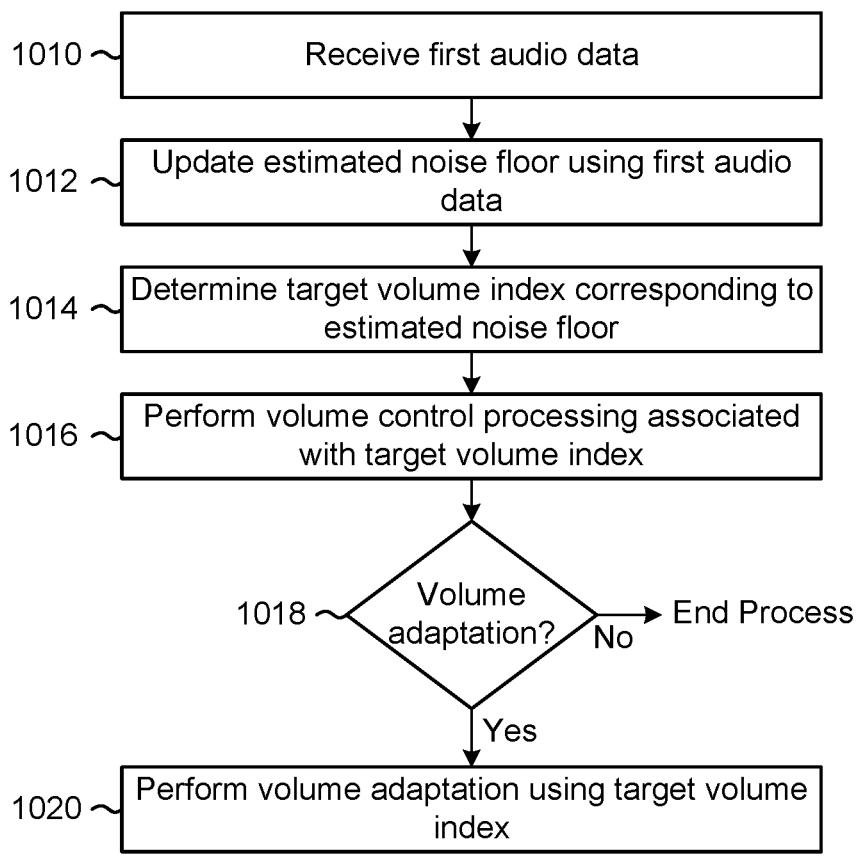
FIG. 10 is a flowchart conceptually illustrating an example method for performing volume adaptation according to examples of the present disclosure.

FIG. 10 is a flowchart conceptually illustrating an example method for performing volume adaptation according to examples of the present disclosure. As illustrated in FIG. 10, the device 110 may receive (1010) first audio data that may comprise a plurality of audio frames. As described above, the first audio data may be received from an AEC component and the first audio data may represent isolated audio data after performing echo cancellation. The device 110 may update (1012) an estimated noise floor using the first audio data. For example, the device 110 may determine a frame energy for an individual audio frame of the first audio data, indicating an amount of energy represented within desired frequency range(s) of the audio frame. As described in greater detail above with regard to FIG. 4, in some examples the device 110 may use a leaky integrator in order to calculate the estimated noise floor. For example, when the frame energy is above the estimated noise floor the leaky integrator may apply attack time constants (e.g., increasing the estimated noise floor), whereas when the frame energy is below the estimated noise floor the leaky integrator may apply release time constants (e.g., decreasing the estimated noise floor).

The device 110 may determine (1014) a target volume index corresponding to the estimated noise floor. For example, the device 110 may determine a difference value indicating a difference between the estimated noise floor value and a noise reference value, may determine a gain value based on the difference value, and may determine the target volume index value using the gain value and a current volume index value, as described in greater detail above with regard to FIG. 6. However, the disclosure is not limited thereto and the device 110 may determine the target volume index value using other techniques without departing from the disclosure.

In some examples, the device 110 may determine the target volume index using a maximum gain value (e.g., limiting an amount of gain to apply if the gain value is above a maximum threshold value), a minimum gain value (e.g., maintaining the current volume index as the target volume index if the gain is below a minimum threshold value), and/or the like without departing from the disclosure. Thus, the device 110 may limit a maximum amount of gain produced by a single volume change and/or require a minimum amount of gain to trigger a volume change, although the disclosure is not limited thereto. Additionally or alternatively, the device 110 may determine the target volume index using one or more volume tables without departing from the disclosure. For example, the device 110 may generate the volume table(s) using quantization, such that potential volume indexes correspond to quantized values that are not continuous, although the disclosure is not limited thereto.

The device 110 may perform (1016) volume control processing associated with the target volume index. In some examples, the device 110 may apply volume control processing using hold times, hysteresis times, a quiet level threshold, and/or the like without departing from the disclosure. For example, if the target volume index corresponds to a volume change in the same direction as a previous volume change, the volume control processing may apply a first hold time to ensure that a first duration of time has elapsed since the previous volume change. Thus, the volume control processing may ignore the target volume index and maintain a current volume index until the first duration of time has elapsed. In contrast, if the target volume index corresponds to a volume change in the opposite direction as a previous volume change, the volume control processing may apply a second hold time (e.g., hysteresis time) to ensure that a second duration of time has elapsed since the previous volume change. Thus, the volume control processing may ignore the target volume index and maintain a current volume index until the second duration of time has elapsed. Finally, if the estimated noise floor value is below a quiet level threshold value, the device 110 may ignore the target volume index and maintain a current volume index. Avoiding volume adaptation when the estimated noise floor value is below the quiet level threshold value may prevent spurious changes in volume level caused by speech activity in a quiet environment.

The device 110 may determine (1018) whether volume adaptation is permitted based on the volume control processing and, if not, may end the process and maintain the current volume index. However, if the device 110 determines that volume adaptation is permitted by the volume control processing, the device 110 may perform (1020) the volume adaptation using the target volume index, as described above with regard to FIGS. 3-4.

Figure 11:
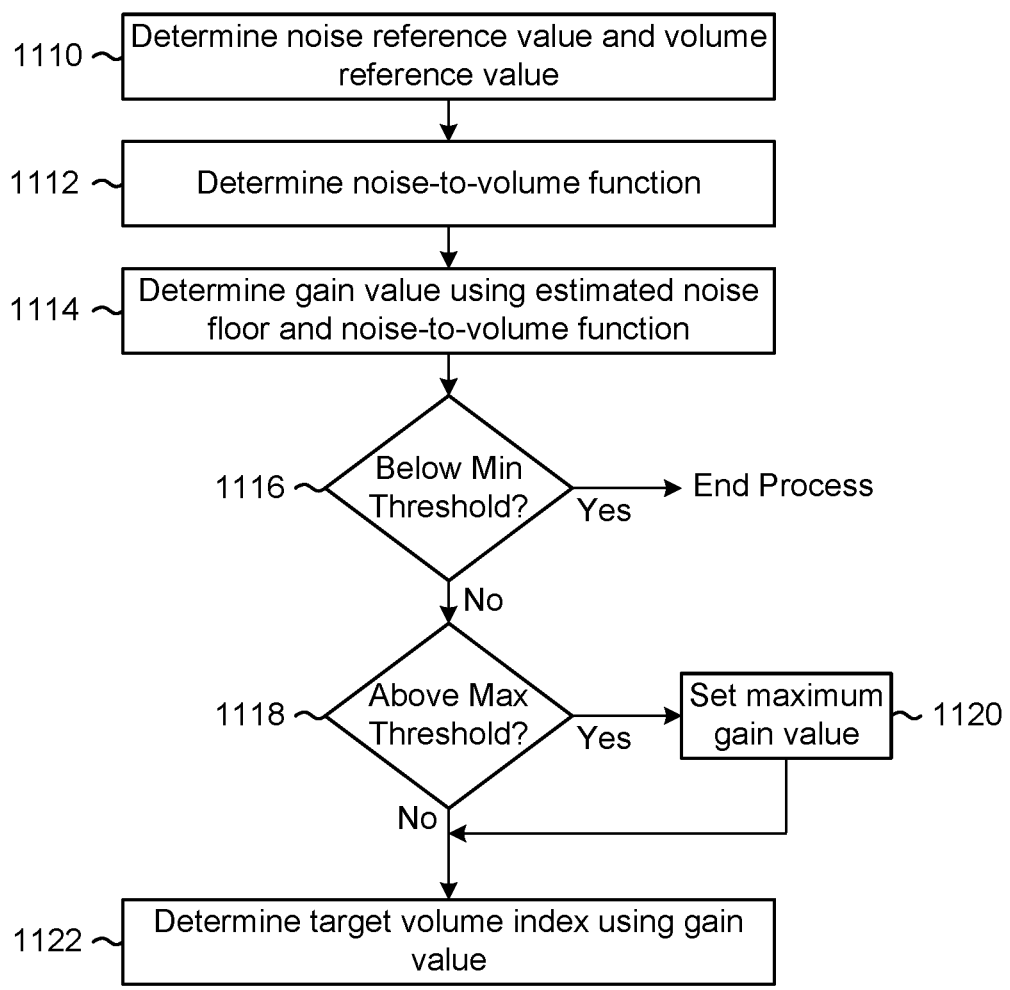
FIG. 11 is a flowchart conceptually illustrating an example method for determining a target volume index according to examples of the present disclosure.

FIG. 11 is a flowchart conceptually illustrating an example method for determining a target volume index according to examples of the present disclosure. As illustrated in FIG. 11, the device 110 may determine (1110) a noise reference value and a volume reference value and may determine (1112) a noise-to-volume function using the noise reference value and the volume reference value, as described above with regard to FIGS. 6-7. For example, the device 110 may determine the noise reference value based on a current mode of operation, such that the noise reference value may correspond to an estimated noise floor associated with a most recent volume change, an estimated noise floor associated with a current session, a calibrated noise floor associated with the device 110, and/or the like without departing from the disclosure.

The device 110 may determine (1114) a gain value using the estimated noise floor and the noise-to-volume function, as described above with regard to FIG. 6. For example, the device 110 may determine a noise compensation value based on a difference between the estimated noise floor and the noise reference value and may determine the gain value using the noise compensation value and a slope coefficient value (e.g., m) associated with the noise-to-volume function.

The device 110 may determine (1116) whether the gain value is below a minimum threshold value, in which case the device 110 may end the process without performing volume adaptation. However, if the device 110 determines that the gain value exceeds the minimum threshold value, the device 110 may determine (1118) whether the gain value is above a maximum threshold value. For example, if the target volume exceeds the current volume by more than the maximum threshold value (e.g., 5 dB), the device 110 may limit the gain value to the maximum threshold value. If the gain value is above the maximum threshold value, the device 110 may set (1120) a maximum gain value instead of the current gain value. Using the gain value, which is limited to the maximum gain value, the device 110 may determine (1122) a target volume index with which to generate the playback audio.

Figure 12:
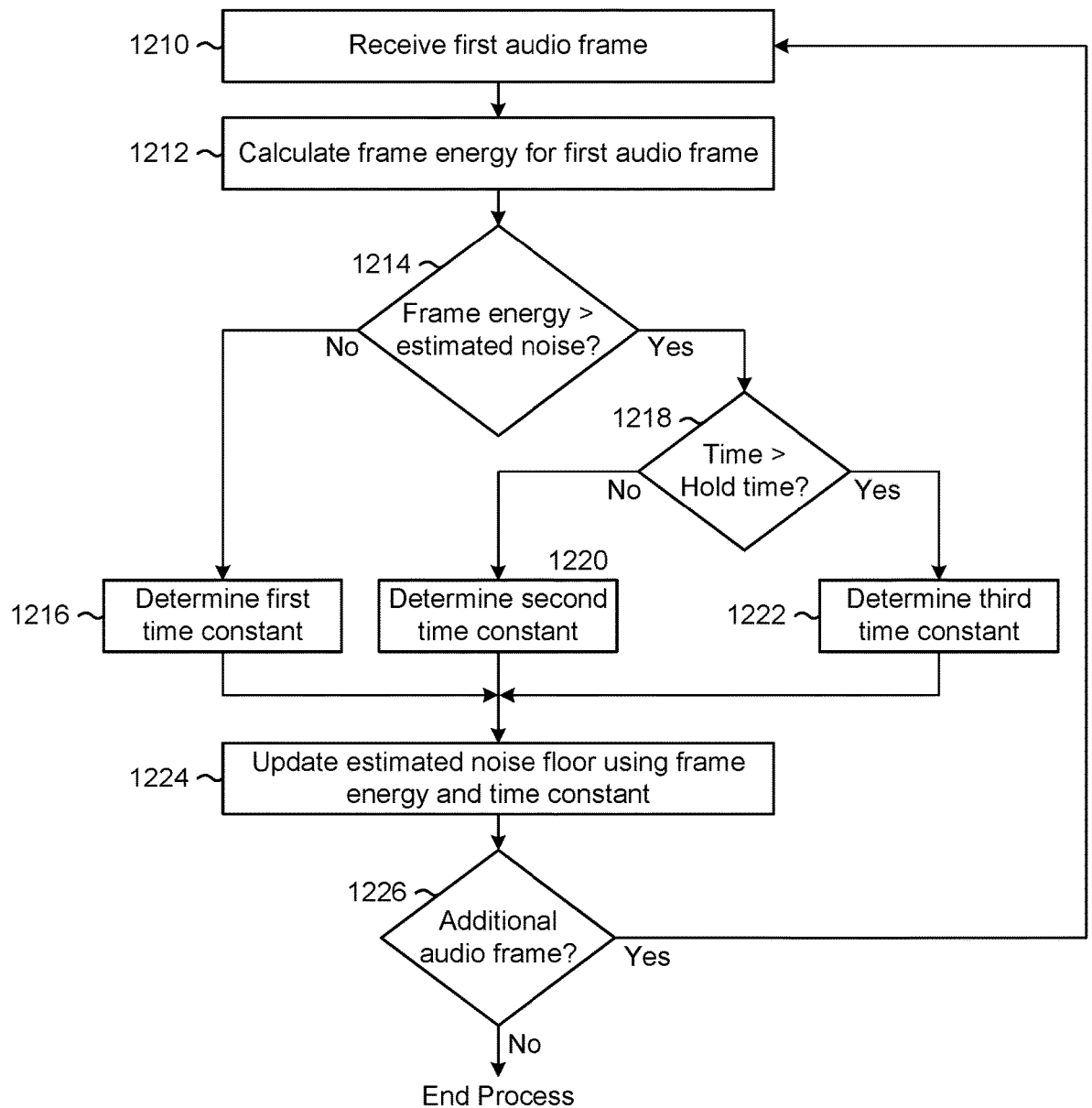
FIG. 12 is a flowchart conceptually illustrating an example method for determining an estimated noise floor value according to examples of the present disclosure.

FIG. 12 is a flowchart conceptually illustrating an example method for determining an estimated noise floor value according to examples of the present disclosure. As illustrated in FIG. 12, the device 110 may receive (1210) a first audio frame and may calculate (1212) a frame energy for the first audio frame. For example, the first audio frame may be an individual audio frame included in isolated audio data generated by the AEC component 350 and/or the frame energy may be calculated using desired frequency range(s) of the first audio frame, although the disclosure is not limited thereto.

The device 110 may determine (1214) whether the frame energy is greater than an estimated noise floor value and, if not, may determine (1216) a first time constant (e.g., release time constant). If the frame energy is greater than the estimated noise floor value, the device 110 may determine (1218) whether an attack time exceeds a hold time and, if not, may determine (1220) a second time constant (e.g., slow attack time constant). If the attack time exceeds the hold time, indicating that the frame energy values for successive audio frames have been greater than the estimated noise floor values for a first duration of time (e.g., 2 seconds, although the disclosure is not limited thereto), the device 110 may determine (1222) a third time constant (e.g., fast attack time constant). Thus, the device 110 may initially apply a slow attack time constant to avoid increasing the estimated noise floor based on transient sounds and then may adaptively increase the attack time constant when the sound continues for a sufficient duration of time.

The device 110 may update (1224) the estimated noise floor using the frame energy and the time constant determined above. For example, the device 110 may update the noise floor using the frame energy and applying the first time constant determined in step 1216, the second time constant determined in step 1220, or the third time constant determined in step 1222, although the disclosure is not limited thereto. The device 110 may then determine (1226) whether there is an additional audio frame, and if so, may loop to step 1210 and perform steps 1210-1224 for the additional audio frame. If the device 110 determines that there is not an additional audio frame, the device 110 may end the process. While not illustrated in FIG. 12, after updating the estimated noise floor in step 1224, the device 110 may use a current estimated noise floor value to determine the gain value, the target volume index, and/or the like as described in greater detail above.

Figure 13:
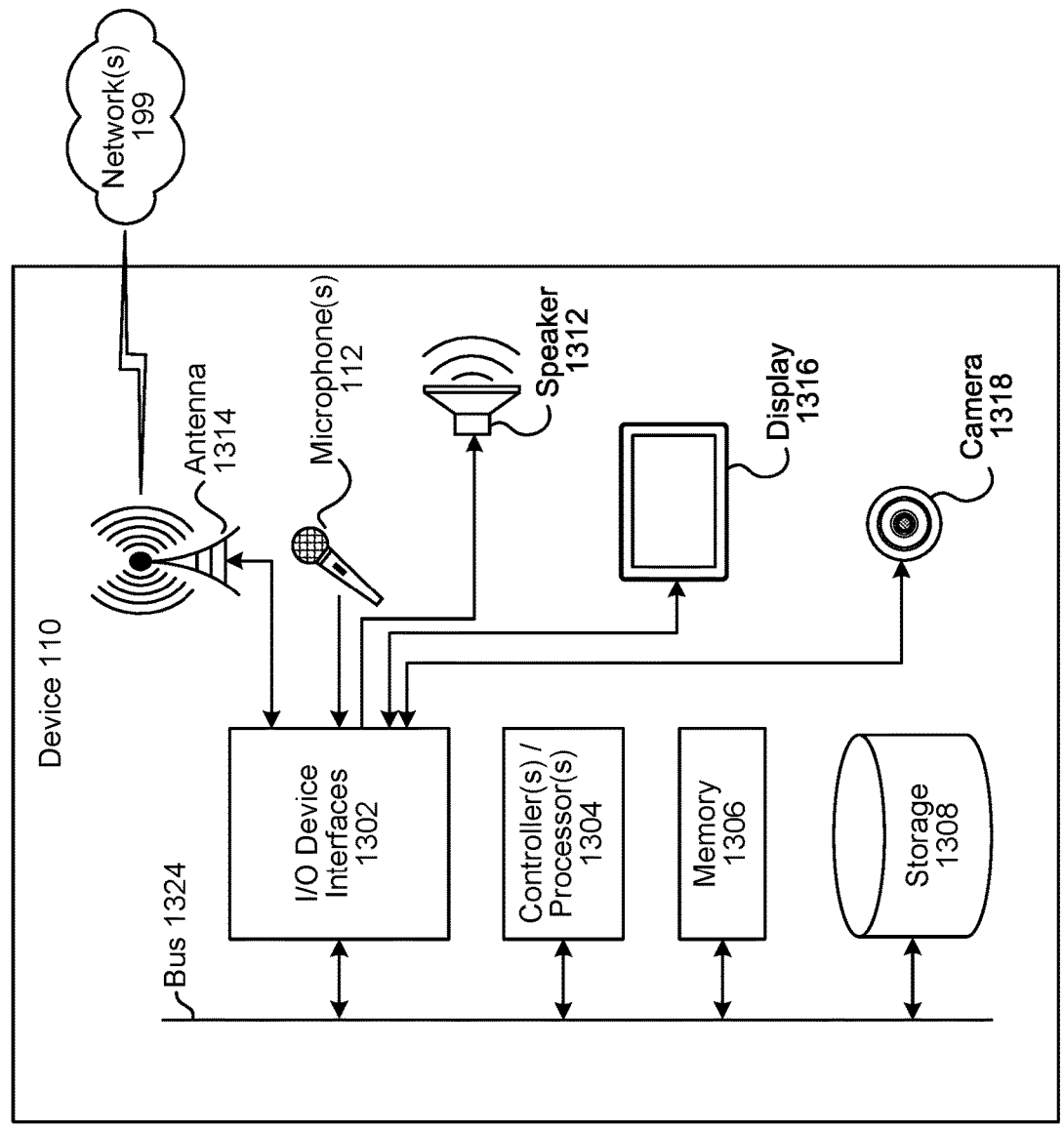
FIG. 13 is a block diagram conceptually illustrating example components of a device, according to embodiments of the present disclosure.
Figure 14:
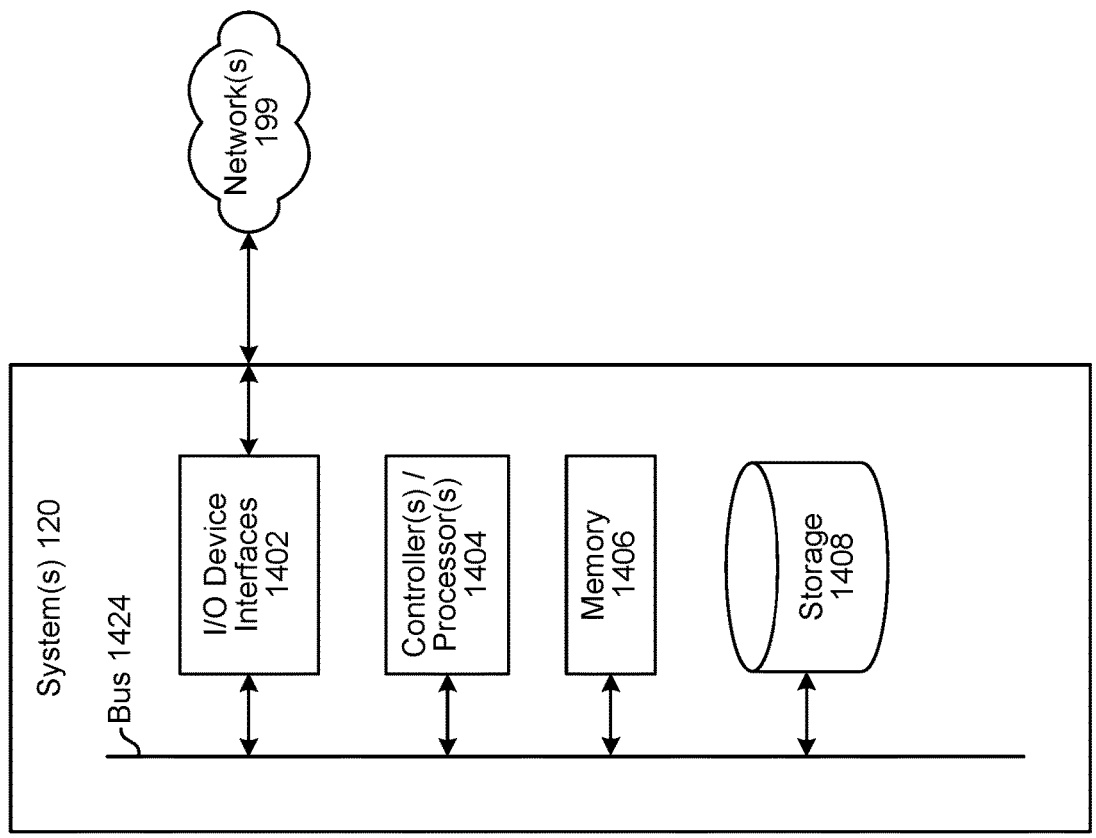
FIG. 14 is a block diagram conceptually illustrating example components of a system, according to embodiments of the present disclosure.

FIG. 13 is a block diagram conceptually illustrating a device 110 that may be used with the system. FIG. 14 is a block diagram conceptually illustrating example components of system(s) 120, such as the natural language command processing system, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system 120 may be located remotely from the device 110 as its operations may not require proximity to the user. The server/system 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). One benefit to the server/system 120 being in a user's home/business is that data used to process a command/return a response may be kept within the user's home, thus reducing potential privacy concerns.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1304/1404), which may each include a central processing unit (CPU) for processing data and computer-readable instructions, and a memory (1306/1406) for storing data and instructions of the respective device. The memories (1306/1406) may individually include volatile random access memory (RAM), non-volatile read only memory (ROM), non-volatile magnetoresistive memory (MRAM), and/or other types of memory. Each device (110/120/125) may also include a data storage component (1308/1408) for storing data and controller/processor-executable instructions. Each data storage component (1308/1408) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1302/1402).

Computer instructions for operating each device (110/120/125) and its various components may be executed by the respective device's controller(s)/processor(s) (1304/1404), using the memory (1306/1406) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

Each device (110/120/125) includes input/output device interfaces (1302/1402). A variety of components may be connected through the input/output device interfaces (1302/1402), as will be discussed further below. Additionally, each device (110/120/125) may include an address/data bus (1324/1424) for conveying data among components of the respective device. Each component within a device (110/120/125) may also be directly connected to other components in addition to (or instead of) being connected to other components across the bus (1324/1424).

Referring to FIG. 13, the device 110 may include input/output device interfaces 1302 that connect to a variety of components such as an audio output component such as one or more loudspeaker(s) 1312, a wired headset or a wireless headset (not illustrated), or other component capable of outputting audio. The device 110 may also include an audio capture component. The audio capture component may be, for example, one or more microphone(s) 1320 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1316 for displaying content. The device 110 may further include a camera 1318.

Via antenna(s) 1322, the input/output device interfaces 1302 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1302/1402) may also include communication components that allow data to be exchanged between devices such as different physical servers in a collection of servers or other components.

The components of the device(s) 110, the system(s) 120 (e.g., natural language command processing system), or a skill system 125 may include their own dedicated processors, memory, and/or storage. Alternatively, one or more of the components of the device(s) 110, the system(s) 120, or a skill system 125 may utilize the I/O interfaces (1302/1402), processor(s) (1304/1404), memory (1306/1406), and/or storage (1308/1408) of the device(s) 110, the system(s) 120, or the skill system 125, respectively. Thus, an ASR component may have its own I/O interface(s), processor(s), memory, and/or storage; an NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and a skill system 125, as described herein, are illustrative, and may be located as a stand-alone device or may be included, in whole or in part, as a component of a larger device or system. As can be appreciated, a number of components may exist either on the system(s) 120 and/or on the device 110. Unless expressly noted otherwise, the system version of such components may operate similarly to the device version of such components and thus the description of one version (e.g., the system version or the local version) applies to the description of the other version (e.g., the local version or system version) and vice-versa.

Figure 15:
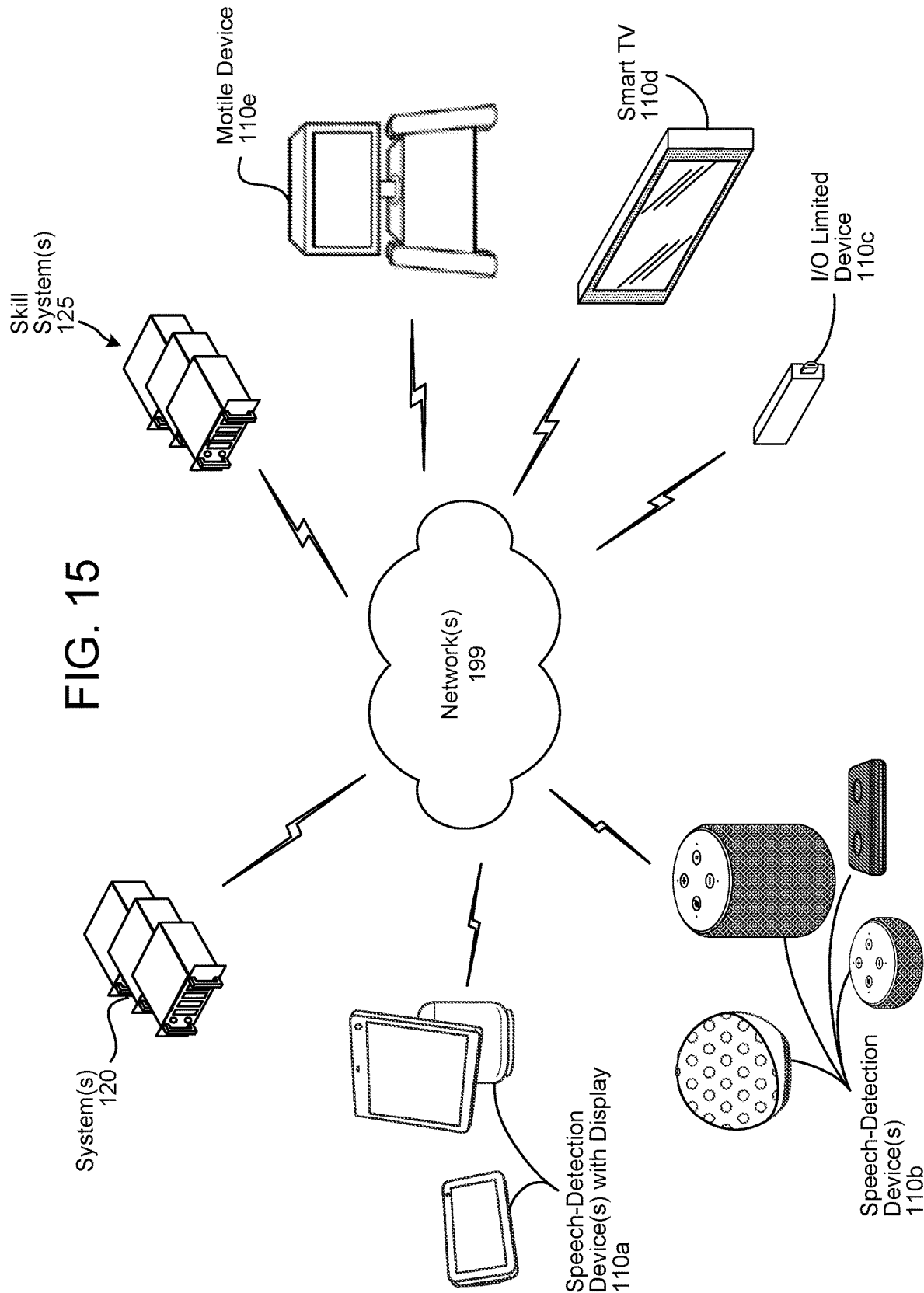
FIG. 15 illustrates an example of a computer network for use with the overall system, according to embodiments of the present disclosure.

As illustrated in FIG. 15, multiple devices (110a-110e, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, speech-detection device(s) with display 110a, speech-detection device(s) 110b, an input/output limited device 110c, a display/smart television 110d, and/or a motile device 110e may be connected to the network(s) 199 through a wireless service provider, over a Wi-Fi or cellular network connection, or the like. Other devices are included as network-connected support devices, such as the natural language command processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as an ASR component, an NLU component, etc. of a natural language command processing system.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
    determining a first volume value corresponding to an output volume setting of a device in an environment;
    determining first audio data representing audio captured by a microphone of the device;
    determining, using a first portion of the first audio data, a first noise reference value representing a first amount of first noise present in the environment within a first time window:
    processing a second portion of the first audio data to determine a plurality of energy values corresponding to second noise present in the environment within a second time window after the first time window;
    determining a first value representing a lower energy portion of the plurality of energy values;
    determining, using the first value and the first noise reference value, a noise compensation value;
    determining a first gain value using the noise compensation value;
    determining, using the first volume value and the first gain value, a second volume value corresponding to the output volume setting of the device; and
    generating first output audio using the second volume value.

2. The computer-implemented method of claim 1, further comprising:
    prior to determining the first volume value, determining a third volume value;
    in response to determining the third volume value, determining a second noise reference value;
    determining, using the third volume value and the second noise reference value, a fourth volume value; and
    generating second output audio using the fourth volume value.

3. The computer-implemented method of claim 1, further comprising:
    after generating the first output audio, receiving a third volume value;
    determining, using the third volume value and the first noise reference value, a fourth volume value; and
    generating second output audio using the fourth volume value.

4. The computer-implemented method of claim 1, wherein determining the first value further comprises:
    determining that a first energy value of the plurality of energy values is greater than a second value;
    determining a third value using the first energy value and a first time constant;
    determining that a second energy value of the plurality of energy values is less than the third value; and
    determining the first value using the second energy value and a second time constant.

5. The computer-implemented method of claim 1, wherein determining the first value further comprises:
    determining that a first energy value of the plurality of energy values is greater than a second value;
    determining that a first duration of time has not elapsed;
    determining a third value using the second value, the first energy value, and a first time constant value;
    determining that a second energy value of the plurality of energy values is greater than the third value;
    determining that the first duration of time has elapsed; and
    determining the first value using a third value, the second energy value, and a second time constant value that is smaller than the first time constant value.

6. The computer-implemented method of claim 1, further comprising:
    determining a first plurality of noise values that includes the first value;
    determining a second plurality of gain values that includes the first gain value;
    determining correlation data representing a correlation between the first plurality of noise values and the second plurality of gain values;
    determining that the correlation data satisfies a condition; and
    determining to maintain the first volume value for a first duration of time.

7. The computer-implemented method of claim 1, wherein determining the second volume value further comprises:
    determining, using quantized gain data, a second gain value corresponding to the first volume value;
    determining a third gain value by adding the second gain value and the first gain value; and
    determining, using the quantized gain data and the third gain value, the second volume value.

8. The computer-implemented method of claim 1, wherein determining the first gain value further comprises:
    determining, using the noise compensation value, a second gain value;
    determining that the second gain value exceeds a threshold gain value; and in response to the second gain value exceeding the threshold gain value, setting the first gain value equal to the threshold gain value.

9. The computer-implemented method of claim 1, wherein determining the first value further comprises:
   determining that a first subset of the plurality of energy values corresponds to user-generated speech represented in the first audio data;
   determining that a second subset of the plurality of energy values corresponds to machine-generated speech represented in the first audio data; and
   determining the first value using the second subset of the plurality of energy values.

10. The computer-implemented method of claim 1, wherein, at a first time, the second volume value is larger than the first volume value, the method further comprising:
    determining, at a second time, a third volume value;
    determining that the third volume value is larger than the second volume value;
    determining that a first duration of time has elapsed between the first time and the second time; and
    generating second output audio using the third volume value.

11. The computer-implemented method of claim 10, further comprising:
    determining, at a third time, a fourth volume value;
    determining that the fourth volume value is smaller than the third volume value;
    determining that a second duration of time has not elapsed between the second time and the third time, the second duration of time being longer than the first duration of time; and
    generating third output audio using the third volume value.

12. A system comprising:
    at least one processor; and
    one or more computer readable media storing processor executable instructions which, when executed using the at least one processor, cause the system to:
       determine a first volume value corresponding to an output volume setting of a device in an environment;
       determine first audio data representing audio captured by a microphone of the device;
       process the first audio data to determine a plurality of energy values corresponding to noise in the environment;
       determine a first value representing a lower energy portion of the plurality of energy values;
       determine, using the first value and a first noise reference value, a noise compensation value;
       determine a first gain value using the noise compensation value;
       determine, using quantized gain data, a second gain value corresponding to the first volume value;
       determine a third gain value by adding the second gain value and the first gain value;
       determine, using the quantized gain data and the third gain value, a second volume value corresponding to the output volume setting of the device; and
       generate first output audio using the second volume value.

13. The system of claim 12, wherein the one or more computer readable media store further processor executable instructions which, when executed using the at least one processor, further cause the system to:
    prior to determining the first volume value, determine a third volume value;
    in response to determining the third volume value, determine a second noise reference value;
    determine, using the third volume value and the second noise reference value, a fourth volume value; and
    generate second output audio using the fourth volume value.

14. The system of claim 12, wherein the one or more computer readable media store further processor executable instructions which, when executed using the at least one processor, further cause the system to:
    after generating the first output audio, determine a third volume value;
    determine, using the third volume value and the first noise reference value, a fourth volume value; and
    generate second output audio using the fourth volume value.

15. The system of claim 12, wherein the one or more computer readable media store further processor executable instructions which, when executed using the at least one processor, further cause the system to:
    determine that a first energy value of the plurality of energy values is greater than a second value;
    determine a third value using the first energy value and a first time constant value;
    determine that a second energy value of the plurality of energy values is less than the third value; and
    determine the first value using the second energy value and a second time constant value.

16. The system of claim 12, wherein the one or more computer readable media store further processor executable instructions which, when executed using the at least one processor, further cause the system to:
    determine that a first energy value of the plurality of energy values is greater than a second value;
    determine that a first duration of time has not elapsed;
    determine a third value using second value, the first energy value, and a first time constant value;
    determine that a second energy value of the plurality of energy values is greater than the third value;
    determine that the first duration of time has elapsed; and
    determine the first value using third value, the second energy value, and a second time constant value that is smaller than the first time constant value.

17. The system of claim 12, wherein the one or more computer readable media store further processor executable instructions which, when executed using the at least one processor, further cause the system to:
    determine a first plurality of noise values that includes the first value;
    determine a second plurality of gain values that includes the first gain value;
    determine correlation data representing a correlation between the first plurality of noise values and the second plurality of gain values;
    determine that the correlation data satisfies a condition; and
    determine to maintain the first volume value for a first duration of time.

18. The system of claim 12, wherein the one or more computer readable media store further processor executable instructions which, when executed using the at least one processor, further cause the system to:
    determine that the third gain value exceeds a threshold gain value; and
    in response to the third gain value exceeding the threshold gain value, determine the second volume value using the quantized gain data and the threshold gain value.

19. The system of claim 12, wherein the one or more computer readable media store further processor executable instructions which, when executed using the at least one processor, further cause the system to:
- determine that a first subset of the plurality of energy values corresponds to user-generated speech represented in the first audio data;
- determine that a second subset of the plurality of energy values corresponds to machine-generated speech represented in the first audio data; and
- determine the first value using the second subset of the plurality of energy values.

20. A computer-implemented method, the method comprising:
- determining a first volume value corresponding to an output volume setting of a device in an environment;
- determining first audio data representing audio captured by a microphone of the device;
- processing the first audio data to determine a plurality of energy values corresponding to noise in the environment;
- determining that a first portion of the first audio data represents user-generated speech;
- determining that a second portion of the first audio data represents machine-generated speech;
- determining a first value using a subset of the plurality of energy values that corresponds to the second portion of the first audio data, the first value representing a lower energy portion of the subset of the plurality of energy values;
- determining, using the first value and a first noise reference value, a noise compensation value;
- determining a first gain value using the noise compensation value;
- determining, using the first volume value and the first gain value, a second volume value corresponding to the output volume setting of the device; and
- generating first output audio using the second volume value.

* * * * *